(12) United States Patent
Jurek

(10) Patent No.: US 12,264,874 B2
(45) Date of Patent: Apr. 1, 2025

(54) HEATING, VENTILATION AND AIR CONDITIONING SYSTEM WITH ILLUMINATION

(71) Applicant: Dometic Sweden AB, Solna (SE)

(72) Inventor: Todd Jason Jurek, Elkhart, IN (US)

(73) Assignee: Dometic Sweden AB, Solna (SE)

( * ) Notice: Subject to any disclaimer, the term of this patent is extended or adjusted under 35 U.S.C. 154(b) by 678 days.

(21) Appl. No.: 17/205,719

(22) Filed: Mar. 18, 2021

(65) Prior Publication Data

US 2021/0207882 A1     Jul. 8, 2021

Related U.S. Application Data

(63) Continuation-in-part of application No. 17/252,506, filed as application No. PCT/IB2019/055060 on Jun. 17, 2019.

(60) Provisional application No. 62/992,595, filed on Mar. 20, 2020, provisional application No. 62/686,217, filed on Jun. 18, 2018.

(51) Int. Cl.
| | |
|---|---|
| *F25D 27/00* | (2006.01) |
| *B60H 1/00* | (2006.01) |
| *F24F 13/20* | (2006.01) |
| *F25D 23/06* | (2006.01) |

(52) U.S. Cl.
CPC ............. *F25D 27/00* (2013.01); *F25D 23/06* (2013.01)

(58) Field of Classification Search
CPC ............ B60H 1/00364; B60H 1/00371; B60H 1/3226; B60H 2001/00235; F25D 27/00
See application file for complete search history.

(56) References Cited

U.S. PATENT DOCUMENTS

| | | |
|---|---|---|
| 2,799,143 A | 7/1957 | Weigel |
| D226,381 S | 2/1973 | Harty, Jr. |
| 4,051,691 A | 10/1977 | Dawkins |
| 4,366,530 A | 12/1982 | Milhous |
| 4,513,809 A | 4/1985 | Schneider et al. |
| D284,025 S | 5/1986 | Armstrong |
| 4,641,502 A | 2/1987 | Aldrich |
| 4,672,818 A | 6/1987 | Roth |

(Continued)

FOREIGN PATENT DOCUMENTS

| | | |
|---|---|---|
| AU | 2004202967 | 3/2011 |
| AU | 2007200788 | 9/2011 |

(Continued)

OTHER PUBLICATIONS

Francini V, WO-2009021994-A1 and translation (Year: 2009).*

(Continued)

*Primary Examiner* — Steven S Anderson, II
(74) *Attorney, Agent, or Firm* — Dinsmore & Shohl LLP

(57) ABSTRACT

Present embodiments relate to a heating, ventilation, air conditioning ("HVAC") system which is used in both fixed and mobile structures, and which has a luminaire disposed in the HVAC to provide illumination therefrom. The luminaire may be a single continuously on light or it may be a flashing light with one or more patterns. The light may emit a single or multiple colors. The light may also have a flashing sequence which corresponds to audio. The light may be wired to a switch and/or may be controlled by a smart device in wireless communication with the HVAC system.

15 Claims, 14 Drawing Sheets

(56) References Cited

U.S. PATENT DOCUMENTS

| | | |
|---|---|---|
| 4,709,623 A | 12/1987 | Roth |
| D300,777 S | 4/1989 | Bales |
| 4,825,936 A | 5/1989 | Hoagland et al. |
| D306,341 S | 2/1990 | Bales |
| 5,184,474 A | 2/1993 | Ferdows |
| 5,205,130 A | 4/1993 | Pannell |
| 5,423,187 A | 6/1995 | Fournier |
| 5,531,641 A | 7/1996 | Aldrich |
| 5,848,536 A | 12/1998 | Dodge |
| 6,161,609 A | 12/2000 | Ahn |
| 6,213,197 B1 | 4/2001 | Ebbeson |
| 6,263,689 B1 | 7/2001 | Dodge |
| 6,339,934 B1 | 1/2002 | Yoon et al. |
| 6,357,249 B1 | 3/2002 | Robinson et al. |
| 6,449,973 B2 | 9/2002 | Dodge |
| D469,173 S | 1/2003 | Kawanori et al. |
| 6,595,499 B2 * | 7/2003 | Colussi .............. F24F 5/0035 261/DIG. 4 |
| D495,041 S | 8/2004 | Thomas |
| 6,857,953 B2 | 2/2005 | Malott |
| 7,140,192 B2 | 11/2006 | Allen |
| 7,171,822 B2 | 2/2007 | Allen |
| D538,413 S | 3/2007 | Lyu et al. |
| 7,234,315 B2 | 6/2007 | Allen |
| 7,237,397 B2 | 7/2007 | Allen |
| 7,316,119 B2 | 1/2008 | Allen |
| D565,712 S | 4/2008 | Nagahori et al. |
| 7,404,297 B2 | 7/2008 | Chen |
| 7,419,368 B2 | 9/2008 | Milks |
| D588,479 S | 3/2009 | Giese |
| D591,410 S | 4/2009 | Kashimoto |
| 7,739,882 B2 | 6/2010 | Evans |
| D621,492 S | 8/2010 | Tanaka et al. |
| D627,043 S | 11/2010 | Tanaka et al. |
| 7,963,117 B2 | 6/2011 | Allen |
| 8,056,351 B2 | 11/2011 | Marciano |
| D661,386 S | 6/2012 | Bergin |
| D662,472 S | 6/2012 | Tien |
| 8,240,168 B2 | 8/2012 | Holguin |
| 8,347,950 B2 | 1/2013 | Stroobants |
| D680,635 S | 4/2013 | Kashimoto et al. |
| 8,416,101 B2 | 4/2013 | Jang |
| 8,440,143 B2 | 5/2013 | Liptak |
| 8,535,127 B2 | 9/2013 | Malott |
| 8,568,209 B2 | 10/2013 | Boxum |
| D705,917 S | 5/2014 | Hagiwara |
| D708,850 S | 7/2014 | Morine et al. |
| D712,531 S | 9/2014 | Bergin |
| D715,907 S | 10/2014 | Bergin |
| D716,925 S | 11/2014 | Bergin |
| D724,715 S | 3/2015 | Isshiki |
| D755,944 S | 5/2016 | Daniels |
| D759,223 S | 6/2016 | Kosuge |
| D762,528 S | 8/2016 | Allard et al. |
| 9,476,608 B2 * | 10/2016 | Yang .................. F24F 7/065 |
| D770,787 S | 11/2016 | Kim et al. |
| D773,023 S | 11/2016 | Nishiguchi et al. |
| D773,024 S | 11/2016 | Nishiguchi et al. |
| D773,025 S | 11/2016 | Nishiguchi et al. |
| D773,625 S | 12/2016 | Nishiguchi et al. |
| 9,618,260 B2 | 4/2017 | Kang |
| 9,631,832 B2 | 4/2017 | Malott |
| D785,771 S | 5/2017 | Bergin |
| D785,772 S | 5/2017 | Bergin |
| 9,651,284 B2 | 5/2017 | Esch |
| D795,712 S | 8/2017 | Bergin |
| D796,018 S | 8/2017 | Kusuki |
| 9,757,674 B2 | 9/2017 | Kwon |
| D810,251 S | 2/2018 | Yamashita |
| D811,566 S | 2/2018 | Liu |
| D817,466 S | 5/2018 | Moseley |
| 9,975,405 B2 | 5/2018 | Siddiqui |
| D822,806 S | 7/2018 | Niki |
| D822,807 S | 7/2018 | Niki |
| D822,808 S | 7/2018 | Niki |
| D822,809 S | 7/2018 | Niki |
| D822,810 S | 7/2018 | Niki |
| D822,811 S | 7/2018 | Niki |
| D824,499 S | 7/2018 | Williamson |
| D822,190 S | 8/2018 | Isshiki |
| D827,116 S | 8/2018 | Isshiki |
| 10,082,345 B1 | 9/2018 | Mihail |
| D830,526 S | 10/2018 | Niki |
| D830,527 S | 10/2018 | Niki |
| 10,093,152 B2 | 10/2018 | Allard |
| D832,987 S | 11/2018 | Bergin |
| D838,629 S | 1/2019 | Hinsey et al. |
| D839,139 S | 1/2019 | Hinsey et al. |
| D841,138 S | 2/2019 | Williamson |
| D841,139 S | 2/2019 | Bergin |
| D846,717 S | 4/2019 | Niki |
| D846,718 S | 4/2019 | Niki |
| D846,720 S | 4/2019 | Niki |
| D849,217 S | 5/2019 | Yamashita |
| D850,609 S | 6/2019 | Bergin |
| D862,668 S | 10/2019 | Moseley |
| D865,926 S | 11/2019 | Moseley |
| D879,928 S | 3/2020 | Fujioka et al. |
| 10,589,593 B2 | 3/2020 | Westendarp |
| D882,054 S | 4/2020 | Shiota |
| D883,459 S | 5/2020 | Ishihama et al. |
| D884,870 S | 5/2020 | Bergin |
| 10,675,941 B2 | 6/2020 | Williamson |
| 10,696,129 B2 | 6/2020 | Bergin |
| D905,217 S | 8/2020 | Hederstiema |
| D902,365 S | 11/2020 | Niki |
| D907,183 S | 1/2021 | Meda |
| 10,941,955 B2 | 3/2021 | Heral |
| D915,569 S | 4/2021 | Meda |
| D917,036 S | 4/2021 | Hederstierna |
| 11,027,595 B2 | 6/2021 | Smith et al. |
| 11,034,208 B2 | 6/2021 | Williamson |
| D940,287 S | 1/2022 | Fidler |
| D940,289 S | 1/2022 | Hederstierna |
| D944,374 S | 2/2022 | Hederstierna et al. |
| 11,511,603 B2 | 11/2022 | Bilston et al. |
| D980,410 S | 3/2023 | Kim et al. |
| 11,752,827 B2 | 9/2023 | Meda et al. |
| D1,010,080 S | 1/2024 | Hederstierna et al. |
| 2004/0040325 A1 | 3/2004 | Evans |
| 2004/0219924 A1 | 11/2004 | Flynn |
| 2005/0163669 A1 | 7/2005 | Parker |
| 2006/0016213 A1 | 1/2006 | Al Rashidi |
| 2006/0018807 A1 | 1/2006 | Taylor |
| 2006/0052050 A1 | 3/2006 | Malott |
| 2007/0227693 A1 | 10/2007 | Allen |
| 2008/0202138 A1 | 8/2008 | Pabisz |
| 2009/0209193 A1 | 8/2009 | Kloster |
| 2011/0005248 A1 | 1/2011 | Nazario et al. |
| 2011/0253847 A1 | 10/2011 | Kataoka et al. |
| 2012/0127050 A1 | 5/2012 | Song et al. |
| 2013/0120972 A1 | 5/2013 | Chung |
| 2013/0205811 A1 | 8/2013 | Esch |
| 2014/0223928 A1 | 8/2014 | Esch |
| 2014/0260393 A1 | 9/2014 | Siddiqui |
| 2017/0079119 A1 * | 3/2017 | Horist .................. G10H 1/0066 |
| 2017/0097162 A1 | 4/2017 | Seo |
| 2017/0307242 A1 | 10/2017 | Handsaker et al. |
| 2018/0147913 A1 | 5/2018 | Bergin |
| 2018/0328618 A1 | 11/2018 | Palmer |
| 2019/0047353 A1 | 2/2019 | Williamson |
| 2019/0047354 A1 | 2/2019 | Williamson |
| 2019/0128551 A1 | 5/2019 | Heral |
| 2019/0315197 A1 | 10/2019 | Williamson |
| 2020/0148028 A1 | 5/2020 | Westendarp |
| 2020/0198438 A1 | 6/2020 | Liu |
| 2020/0298655 A1 | 9/2020 | Williamson |
| 2020/0338951 A1 | 10/2020 | Paci |
| 2021/0061054 A1 | 3/2021 | Meda |
| 2021/0061058 A1 | 3/2021 | Meda |
| 2021/0061060 A1 | 3/2021 | Meda |
| 2021/0207882 A1 | 7/2021 | Jurek |
| 2021/0239105 A1 | 8/2021 | Allard |
| 2021/0276396 A1 | 9/2021 | Jurek |

(56) References Cited

U.S. PATENT DOCUMENTS

| | | | |
|---|---|---|---|
| 2021/0354526 | A1 | 11/2021 | Williamson |
| 2022/0332170 | A1 | 10/2022 | Williamson et al. |
| 2023/0104268 | A1 | 4/2023 | Do et al. |
| 2023/0111297 | A1 | 4/2023 | Hwang et al. |
| 2023/0347707 | A1 | 11/2023 | Meda et al. |
| 2023/0398830 | A1 | 12/2023 | Eichorst et al. |

FOREIGN PATENT DOCUMENTS

| | | | |
|---|---|---|---|
| AU | 2007237183 | | 12/2012 |
| AU | 2009233601 | | 1/2013 |
| AU | 2007202766 | | 11/2013 |
| AU | 354553 | | 3/2014 |
| AU | 2012261549 | | 8/2015 |
| AU | 367405 | | 3/2016 |
| AU | 201612249 | | 3/2016 |
| AU | 201613590 | | 7/2016 |
| AU | 201613591 | | 7/2016 |
| AU | 201613592 | | 7/2016 |
| AU | 201613593 | | 7/2016 |
| AU | 2016101949 | | 12/2016 |
| AU | 2017100215 | | 3/2017 |
| AU | 201712794 | | 5/2017 |
| AU | 201712798 | | 5/2017 |
| AU | 2017200186 | | 8/2017 |
| AU | 201810968 | | 3/2018 |
| AU | 201810969 | | 3/2018 |
| AU | 201810970 | | 3/2018 |
| AU | 201810971 | | 3/2018 |
| AU | 201810972 | | 3/2018 |
| AU | 201810973 | | 3/2018 |
| AU | 201810975 | | 3/2018 |
| AU | 201810977 | | 3/2018 |
| AU | 201810978 | | 3/2018 |
| AU | 201816419 | | 1/2019 |
| AU | 201910037 | | 2/2019 |
| AU | 201910038 | | 2/2019 |
| AU | 201911094 | | 4/2019 |
| AU | 201912125 | | 6/2019 |
| AU | 2017364256 | | 6/2019 |
| AU | 2019202512 | | 10/2019 |
| AU | 201915241 | | 12/2019 |
| AU | 201916406 | | 12/2019 |
| AU | 201916408 | | 12/2019 |
| AU | 201916409 | | 12/2019 |
| AU | 2018366469 | | 5/2020 |
| AU | 202016120 | | 1/2021 |
| AU | 202016121 | | 1/2021 |
| AU | 202016122 | | 1/2021 |
| AU | 202016123 | | 1/2021 |
| CA | 2518348 | | 3/2006 |
| CA | 2578651 | | 8/2007 |
| CA | 2587994 | | 12/2007 |
| CA | 2611822 | | 5/2008 |
| CA | 2686403 | | 5/2010 |
| CA | 2906348 | | 9/2014 |
| CA | 2951956 | | 12/2015 |
| CA | 2954152 | | 1/2016 |
| CA | 165232 | | 5/2016 |
| CA | 165233 | | 5/2016 |
| CA | 167431 | | 2/2017 |
| CA | 172872 | | 2/2017 |
| CA | 172873 | S | 2/2017 |
| CA | 172874 | S | 2/2017 |
| CN | 1517608 | A | 8/2004 |
| CN | 1816459 | A | 8/2006 |
| CN | 101943449 | A | 1/2011 |
| CN | 201748561 | U | 2/2011 |
| CN | 102265096 | A | 11/2011 |
| CN | 202546945 | | 11/2012 |
| CN | 203083042 | U | 7/2013 |
| CN | 103237671 | A | 8/2013 |
| CN | 103687735 | A | 3/2014 |
| CN | 204693661 | U | 10/2015 |
| CN | 105159183 | A | 12/2015 |
| CN | 205871826 | U | 1/2017 |
| CN | 106470856 | A | 3/2017 |
| CN | 304097003 | S | 4/2017 |
| CN | 106976376 | A | 7/2017 |
| CN | 206493894 | U | 9/2017 |
| CN | 108790676 | A | 11/2018 |
| CN | 109070688 | A | 12/2018 |
| CN | 305029216 | S | 2/2019 |
| CN | 305029217 | S | 2/2019 |
| CN | 305029218 | S | 2/2019 |
| CN | 305105066 | S | 4/2019 |
| CN | 110126588 | A | 8/2019 |
| CN | 110217073 | A | 9/2019 |
| CN | 110293813 | A | 10/2019 |
| CN | 110385958 | A | 10/2019 |
| CN | 305397384 | S | 10/2019 |
| CN | 111344168 | A | 6/2020 |
| CN | 213237518 | | 5/2021 |
| CN | 213237945 | | 5/2021 |
| CN | 306672354 | S | 7/2021 |
| CN | 306681352 | S | 7/2021 |
| CN | 306901266 | S | 10/2021 |
| DE | 1472379 | A1 | 12/1968 |
| DE | 19654261 | | 6/1998 |
| DE | 69503723 | | 9/1998 |
| DE | 19730136 | | 1/1999 |
| DE | 10012157 | C1 | 6/2001 |
| DE | 69817899 | | 10/2003 |
| DE | 20313136 | U1 | 11/2003 |
| DE | 10255833 | | 6/2004 |
| DE | 10336767 | | 12/2004 |
| DE | 59812376 | | 1/2005 |
| DE | 202004007924 | | 11/2005 |
| DE | 202005013530 | | 12/2005 |
| DE | 102004032920 | A1 | 3/2006 |
| DE | 202004017266 | | 4/2006 |
| DE | 202005000560 | | 6/2006 |
| DE | 102005030362 | | 11/2006 |
| DE | 602004004480 | | 3/2007 |
| DE | 202007003764 | U1 | 5/2007 |
| DE | 202006001374 | | 7/2007 |
| DE | 202006001376 | | 7/2007 |
| DE | 202006001377 | | 7/2007 |
| DE | 202006009803 | | 12/2007 |
| DE | 202007006292 | | 10/2008 |
| DE | 102007038716 | | 2/2009 |
| DE | 102007038716 | A1 | 2/2009 |
| DE | 602005012194 | | 2/2009 |
| DE | 202008003123 | | 9/2009 |
| DE | 102008028066 | | 12/2009 |
| DE | 602007009584 | | 11/2010 |
| DE | 502007006725 | | 4/2011 |
| DE | 202011101256 | | 12/2011 |
| DE | 202010012578 | | 2/2012 |
| DE | 202011002986 | | 7/2014 |
| DE | 202013004158 | | 9/2014 |
| DE | 102014200623 | A1 | 7/2015 |
| DE | 102017116909 | A1 | 2/2018 |
| DE | 102016220768 | | 4/2018 |
| DE | 112016004234 | T5 | 6/2018 |
| DE | 112017000915 | | 10/2018 |
| DE | 102017214941 | | 2/2019 |
| DE | 102017207797 | | 8/2019 |
| DE | 112017005541 | | 8/2019 |
| DE | 102018204532 | | 9/2019 |
| DE | 102018206490 | | 10/2019 |
| DE | 102019205194 | | 10/2019 |
| DE | 102017219353 | | 11/2019 |
| DE | 102018206854 | | 11/2019 |
| DE | 112018003284 | | 3/2020 |
| DE | 202015009786 | | 3/2020 |
| DE | 212018000248 | | 3/2020 |
| DE | 212018000249 | | 3/2020 |
| DE | 112018003288 | | 4/2020 |
| DE | 102018222877 | | 6/2020 |
| DE | 102018222877 | A1 | 6/2020 |
| DE | 112018005002 | | 7/2020 |
| DE | 112018005883 | | 7/2020 |
| DE | 102019212949 | A1 | 3/2021 |

(56) References Cited

FOREIGN PATENT DOCUMENTS

| | | | |
|---|---|---|---|
| DE | 102020203424 | | 7/2021 |
| DE | 112020000265 | | 9/2021 |
| DE | 102021208289 | A1 | 2/2023 |
| EP | 0115674 | | 8/1984 |
| EP | 700801 | | 3/1996 |
| EP | 869018 | | 10/1998 |
| EP | 892225 | | 1/1999 |
| EP | 1527919 | A1 * | 5/2005 ......... B60H 1/00207 |
| EP | 1538009 | | 6/2005 |
| EP | 1634740 | | 3/2006 |
| EP | 1721765 | | 11/2006 |
| EP | 1752717 | | 2/2007 |
| EP | 1826041 | | 8/2007 |
| EP | 1870270 | | 12/2007 |
| EP | 1925889 | | 5/2008 |
| EP | 1955946 | | 8/2008 |
| EP | 1988612 | | 11/2008 |
| EP | 2189312 | | 5/2010 |
| EP | 2192040 | | 6/2010 |
| EP | 2196390 | | 6/2010 |
| EP | 2397787 | A2 | 12/2011 |
| EP | 2433658 | | 3/2012 |
| EP | 2665611 | | 10/2014 |
| EP | 2921792 | A1 | 9/2015 |
| EP | 2178710 | | 11/2015 |
| EP | 2616258 | | 2/2016 |
| EP | 3113965 | | 1/2017 |
| EP | 3193096 | A1 | 7/2017 |
| EP | 3241695 | | 4/2018 |
| EP | 2714440 | | 5/2018 |
| EP | 2994326 | | 7/2018 |
| EP | 3401619 | | 11/2018 |
| EP | 3411250 | | 12/2018 |
| EP | 3476630 | | 5/2019 |
| EP | 3543047 | | 9/2019 |
| EP | 3564564 | | 11/2019 |
| EP | 3677459 | A1 | 7/2020 |
| EP | 3592585 | | 7/2021 |
| EP | 4147892 | A1 | 3/2023 |
| JP | H04160905 | A | 6/1992 |
| JP | 2002013761 | A | 1/2002 |
| JP | 201796577 | A | 6/2017 |
| JP | 2020199805 | A | 12/2020 |
| KR | 20080041058 | A | 5/2008 |
| KR | 20100092070 | A | 8/2010 |
| KR | 101445551 | B1 | 9/2014 |
| RU | 2753994 | C2 | 8/2021 |
| WO | 2004108448 | A1 | 12/2004 |
| WO | 2007042065 | A1 | 4/2007 |
| WO | WO-2009021994 | A1 * | 2/2009 ......... B60H 1/00364 |
| WO | 2009055891 | A1 | 5/2009 |
| WO | 2009087094 | | 7/2009 |
| WO | 2012034695 | A1 | 3/2012 |
| WO | 2012113538 | A1 | 8/2012 |
| WO | 2012159749 | A1 | 11/2012 |
| WO | 2013082692 | A1 | 6/2013 |
| WO | 2014097805 | A1 | 6/2014 |
| WO | 2014143181 | A1 | 9/2014 |
| WO | 2014180559 | A1 | 11/2014 |
| WO | 2016203542 | A1 | 12/2016 |
| WO | 2017143393 | A1 | 8/2017 |
| WO | 2017143394 | A1 | 8/2017 |
| WO | 2017149752 | A1 | 9/2017 |
| WO | 2018096127 | A1 | 5/2018 |
| WO | 2018162016 | A1 | 9/2018 |
| WO | 2019038023 | A1 | 2/2019 |
| WO | 2019082168 | A1 | 5/2019 |
| WO | 2019097448 | A1 | 5/2019 |
| WO | 2019207451 | A2 | 10/2019 |
| WO | 2019229706 | A1 | 12/2019 |
| WO | 2019244011 | | 12/2019 |
| WO | 2019244011 | A1 | 12/2019 |
| WO | 2020143636 | A1 | 7/2020 |
| WO | 2020151541 | A1 | 7/2020 |
| WO | 2020188485 | A2 | 9/2020 |
| WO | 2020192746 | A1 | 10/2020 |
| WO | 2021074841 | | 4/2021 |
| WO | 20210186414 | | 9/2021 |

OTHER PUBLICATIONS

Stelter M, EP-1527919-A1 and translation (Year: 2005).*
Design U.S. Appl. No. 29/715,592, filed Dec. 3, 2019 titled Filter Housing.
Design U.S. Appl. No. 29/758,314, filed Nov. 13, 2020 titled Air Conditioning Apparatus.
Dometic Product Catalog—Climate Control. 2015.
Dometic Product Catalog—Climate Control. 2016.
10-Minute Tech, Trailer Life, Jul. 1996, pp. 69-70 dated Jul. 1, 1996.
American RV Company, Dometic 459530 Duo Therm 13,500 BTU Brisk Air Conditioner High Efficiency Upper Unit Trailer Camper RV, Mar. 23, 2014, https://web.archive.org/web/20140323013456/http://www.americanrvcompany.com/Dometic-459530-Duo-Therm-13500-BTU-Brisk-Air-Conditioner-High-Efficiency-Upper-Unit-Trailer-Camper-RV Mar. 23, 2014.
American RV Company, Dometic 541815 High Performance 13,500 BTU Air Conditioner Upper Unit CCC2 Required Electronics Pre-Installed Camper Trailer RV, https://web.archive.org/web/20140323014940/http://www.americanrvcompany.com/Dometic-541815-High-Performance-13500-BTU-Air-Conditioner-Upper-Unit-CCC2-Required-Electronics-Pre-Installed-Camper-Trailer-RV Mar. 23, 2014.
American RV Company, Dometic 541916 High Performance 15,000 BTU Air Conditioner Upper Unit Single Zone LCD Thermostat Required Electronics Pre-Installed Camper Trailer RV, https://web.archive.org/web/20140323014952/http://www.americanrvcompany.com/Dometic-541916-High-Performance-15000-BTU-Air-Conditioner-Upper-Unit-Single-Zone-LCD-Thermostat-Required-Electronics-Pre-Installed-Camper-Trailer-RV Mar. 23, 2014.
American RV Company, Dometic 551816 High Performance 15,000 BTU Heat Pump for Comfort Control Center II Camper Trailer RV, http://www.americanrvcompany.com/Dometic-551816-High-Performance-15000-BTU-Heat-Pump-for-Comfort-Control-Center-II-Camper-Trailer-RV Apr. 15, 2012.
American RV Company, Dometic 541816 High Performance 15,000 BTU Air Conditioner Upper Unit CCC2 Required Electronics Pre-Installed Camper Trailer RV, http://www.americanrvcompany.com/Dometic-541816-High-Performance-15000-BTU-Air-Conditioner-Upper-Unit-CCC2-Required-Electronics-Pre-Installed-Camper-Trailer-RV Mar. 23, 2014.
Dirna Bergstrom: Slim Cool; http://www.dirna.com/files/dirna-manuals/220RE00183.pdf May 21, 2014.
Dometic Corporation, Dometic High Performance Air Conditioners, 2 pages, Jan. 1, 2011.
Dometic Duo-Therm, p. 140, Feb. 23, 2013.
Dometic Group: "Climate Control", http://www.dometic.com/enus/Americas/USA/RV-Products/climate, 2 pages.
Dometic Waeco Coolair RT 880; http://www.dometic.co.uk/product/waeco-coolair-rt-880-2/ May 14, 2015.
Eberspacher Cooltronic Parking Coolers with High Efficiency with the Engine OFF; http://www.eberspacher.com/products/air-conditioning/cooltronic-truck-parking-coolers.html Jun. 23, 2015.
Indelb; WO Oblo; Sleeping Well Oblo; http://www.indelb.com/products/parking_air_cooler/sleeping_well/sw_oblo Apr. 1, 2016.
Webasto: Rooftop air conditioning systems: Rooftop 3.5-9.9 kw; https://web.archive.org/web/20161201014045/https://www.webasto.com/au/markets-products/off-highway/air-conditioning/rooftop-air-conditioning/rooftop-ac-35-99-kw/.
Webasto; Truck parking cooler: Cool Top Vario 10 E; http://www.webasto.com/GB/marketsproducts/truck/air-conditioning/products/cool-top-vario/ Apr. 25, 2016.
Youtube; Viesa Kompressor; https://www.youtube.com/watch?v=SPK17XEvVLO May 22, 2012 (https://www.google.com/?gws_rd=ssl#q=https://www.youtube.com/watch?v%3DSPK17XEvVL0&spf=1495819902591).

(56) References Cited

OTHER PUBLICATIONS

Dirna Bergstrom: Parking Coolers—No-Idle Electrical A/C—MiniCool Compact 1.4; http://www.dirna.com/parking-coolers-no-idle-electrical-ac-compact/ Mar. 17, 2015.
Design U.S. Appl. No. 29/760,605, filed Dec. 2, 2020.
U.S. Appl. No. 63/141,800, filed Jan. 26, 2021 titled Air Conditioning System for a Vehicle.
Design U.S. Appl. No. 29/767,929, filed Jan. 26, 2021 titled Air Conditioner Housing.
Design U.S. Appl. No. 29/774,535, filed Mar. 17, 2021 titled Air Distribution Box.
Provisional U.S. Appl. No. 63/175,304, filed Apr. 1, 2021.
Provisional U.S. Appl. No. 62/819,711, filed Mar. 18, 2019 titled Mobile Air Conditioner.
Climate Control IBIS4-IB36H401R1, 1B36H401RIY Air conditioning roof unit Installation Manual, https://epi.dometic.com/externalassets/ibis4-roof-top-adb_9600009482_73658.pdf?ref=2016056866, published on Feb. 20, 2020.
Climate Control-FJX-Dometic FreshJet FJX Short Operating Manual EMEA16, https://manuals.plus/dometic/fix-series-fjx4233m-roof-air-conditioner-manual#axzz7gOSILhRB, Jul. 22, 2022.
Dometic FreshJet FJX4233M, FJX4233M, FJX4233EEH, FJX4333E(EH), FJX7333IHP, FJX7337IHP, FJX7457IHP-Dometic Documents Release Dates, https://documents.dometic.com/search/arabic?query=, Jun. 29, 2022.
RecPro RV Air Conditioner 15K Non-Ducted | With Heat Pump for Heating or Cooling Option | RV AC Unit 1 Camper Air Conditioner (Black), https://www.amazon.com/dp/B089MH5WCM/ref=syn_sd_onsite_desktop_41?pd_rd_plhdr-t&th=1, Jun. 4, 2020.
PCT Application No. PCT/CN2022/109994 titled "Fresh air intake in AC" filed on Aug. 3, 2022.
PCT Application No. PCT/EP2022/067107 titled "Ventilation Unit and Recreational Vehicle With a Ventilation Unit" filed on Jun. 23, 2022.
Australia Patent Application No. 2021272652 titled "Air conditioning unit" filed on Sep. 27, 2022.
Restriction Requirement issued in U.S. Appl. No. 29/758,314 mailed on Oct. 11, 2022.
Australia Patent Application No. 2021272270 titled "Air conditioning unit" filed on Sep. 27, 2022.
International Search Report and Written Opinion issued in PCT Application No. PCT/EP2022/067107 mailed on Oct. 13, 2022.
International Search Report and Written Opinion issued in PCT Application No. PCT/CN2022/109994 mailed on Nov. 8, 2022.
U.S. Appl. No. 17/998,616 titled "Air Conditioning Unit" filed on Nov. 11, 2022.
U.S. Appl. No. 17/998,620 titled "Air Conditioning Unit" filed on Nov. 11, 2022.
U.S. Appl. No. 17/998,623 titled "Air Conditioning Unit" filed on Nov. 11, 2022.
Chinese Patent Application No. 202180034145.1 titled "Air Conditioning Unit" filed on Nov. 9, 2022.
Chinese Patent Application No. 2021800341470 titled "Air Conditioning Unit" filed on Nov. 9, 2022.
Chinese Patent Application No. 202180034825.3 titled "Air Conditioning Unit" filed on Nov. 11, 2022.
DE Patent Application No. 102023200650.2 entitled "Ventilating Unit and Recreational Vehicle with a Ventilation Unit" filed on Jan. 26, 2023.
Non-Final issued in U.S. Appl. No. 29/758,314 mailed on Feb. 27, 2023.
China Patent Application No. 202110890392.3 entitled "Ventilation and Air Conditioning Arrangement and Recreational Vehicle With a Ventilation and Air Conditioning Arrangement" filed on Aug. 4, 2021.
DE Patent Application No. 102021208289 entitled "Ventilating Unit and Recreational Vehicle with a Ventilation Unit" filed on Jul. 30, 2021.
International Search Report and Written Opinion Issued for Application No. PCT/IB2021/052330 mailed on Jun. 23, 2021.

Office Action Issued in DE Patent Application No. 102020206181.5 mailed on Apr. 16, 2021.
Office Action Issued in DE Patent Application No. 102020206183.1 mailed on May 7, 2021.
Office Action Issued in DE Patent Application No. 102020206182.3 mailed on May 21, 2021.
EU Application No. 008654396-0001-0006 titled "Lighting and Mobile Air Conditioning Systems with illumination" filed on Aug. 16, 2021.
EU Application No. 008654404-0001-0004 titled "Inventilate—Heat Exchanger" filed on Aug. 16, 2021.
International Search Report and Written Opinion Issued for Application No. PCT/EP2021/061568 mailed on Aug. 10, 2021.
International Search Report and Written Opinion Issued for Application No. PCT/EP2021/061678 mailed on Aug. 11, 2021.
International Search Report and Written Opinion Issued for Application No. PCT/EP2021/061578 mailed on Aug. 20, 2021.
Office Action Issued in DE Application No. 102023200650.2 mailed on Sep. 25, 2023.
Non-Final issued in U.S. Appl. No. 17/252,506 mailed on Oct. 10, 2023.
Ex-Parte Quayle Action issued in U.S. Appl. No. 29/826,755 mailed on Oct. 10, 2023.
Australian Patent Application 202016120 entitled "Shape X" filed on Nov. 11, 2020.
Australian Patent Application 202016121 entitled "Shape X" filed on Nov. 11, 2020.
Australian Patent Application 202016122 entitled "Shape X" filed on Nov. 11, 2020.
Australian Patent Application 202016123 entitled "Shape X" filed on Nov. 11, 2020.
Australian Patent Application 2019291452 entitled "Lighting and Mobile Air Conditioning Systems with illumination" filed Jun. 17, 2019.
Chinese Patent Application 202030660183.6 entitled "Shape X" filed Nov. 3, 2020.
Chinese Patent Application 202030659749.3 entitled "Shape X" filed on Nov. 3, 2020.
Chinese Patent Application 201980040452.3 entitled "Heating, Ventilation and Air Conditioning System with Illumination" filed on Jun. 17, 2019.
European Union Patent Application 007942891-0001-0004 entitled "Shape X" filed on May 15, 2020.
European Patent Application 19759430.2 entitled "Heating, Ventilation and Air Conditioning System with Illumination" filed on Jun. 17, 2019.
German Patent Application 102020206181.5 entitled "Shape X—Antenna" filed on May 15, 2020.
German Patent Application 102020206182.3 entitled "Shape X—Connection Hub" filed on May 15, 2020.
German Patent Application 102020206183.1 entitled "Shape X—Upgrade Kit" filed on May 15, 2020.
International Preliminary Report on Patentability issued for PCT/IB2019/055060 dated Dec. 22, 2020.
Notification of Registration for European Patent Application No. 007942891-0001-0004 mailed on May 21, 2020.
Notification to Grant for Chinese Patent Application No. 202030659749.3 mailed on Apr. 12, 2021.
Notification to Grant for Chinese Patent Application No. 202030660183.6 mailed on Apr. 13, 2021.
Office Action Issued in China Patent Application No. 202030660183.6 mailed on Feb. 23, 2021.
Office Action Issued in China Patent Application No. 202030659749.3 mailed on Feb. 23, 2021.
PCT Application No. PCT/IB2021/052330 entitled "Heating, Ventilation and Air Conditioning System with Illumination" filed on Mar. 19, 2021.
U.S. Appl. No. 62/992,595 entitled "Heating, Ventilation and Air Conditioning System with Illumination" filed Mar. 20, 2020.
U.S. Appl. No. 62/686,217 entitled "Lighting and Mobile Air Conditioning Systems with illumination" filed Jun. 18, 2018.
U.S. Appl. No. 17/252,506 entitled "Lighting and Mobile Air Conditioning Systems with illumination" filed Dec. 15, 2020.

(56) References Cited

OTHER PUBLICATIONS

U.S. Appl. No. 29/758,314 entitled "Air Conditioning Apparatus" filed Nov. 13, 2020.
PCT Application No. PCT/EP2021/061578 entitled "Shape X—Upgrade Kit" filed on May 3, 2021.
PCT Application No. PCT/EP2021/061678 entitled "Shape X—Connection Hub" filed on May 4, 2021.
PCT Application No. PCT/EP2021/061568 entitled "Shape X—Antenna" filed on May 3, 2021.
"Dometic Freshjet Rooftop Conditioner", Available from Internet, URL: https://www.amazon.com/Dometic-FreshJet-Rooftop-Conditioner-13-5K/dp/B0BGYWF8XS, 2022.
Restriction Requirement issued in U.S. Appl. No. 29/826,755 mailed on May 11, 2023.
Office Action Issued in Chinese Application No. 201980040452.3 mailed on May 20, 2023.
Office Action Issued in Chinese Application No. 202230072879.6 mailed on Jun. 5, 2023.
Office Action Issued in Chinese Application No. 202230073218.5 mailed on Jun. 8, 2023.
Office Action Issued in Chinese Application No. 202230073233.X mailed on Jun. 28, 2023.
Notice of Allowability issued in U.S. Appl. No. 29/758,314 mailed on Jul. 17, 2023.
Office Action Issued in Chinese Application No. 202230072942.6 mailed on Jul. 28, 2023.
Corrected Notice of Allowability issued in U.S. Appl. No. 29/758,314 mailed on Aug. 18, 2023.
Office Action Issued in Chinese Application No. 202230072879.6 mailed on Aug. 8, 2023.
European Patent Office, International Search Report and Written Opinion for PCT/IB2019/055060 dated Nov. 29, 2019, 10 pages.
Amazon, Evapolar Personal Air Cooler & Humidifier, Jan. 12, 2017 (retrieved from internet Sep. 27, 2017).
Kickstarter, Zero Breeze World's Coolest Portable Air Conditioner, Sep. 27, 2017.
Negative Ion Generators, UV Purification Light; Ultraviolet Air Probe Sanitizer, Feb. 3, 2017 (retrieved from Internet Sep. 27, 2017).
Australia Application No. 202210863 titled "Air Conditioner" filed on Feb. 16, 2022.
Australia Application No. 202210864 titled "Air Conditioner" filed on Feb. 16, 2022.
Australia Application No. 202210865 titled "Air Conditioner" filed on Feb. 16, 2022.
Australia Application No. 202210874 titled "Air Conditioner" filed on Feb. 16, 2022.
Australia Application No. 202210875 titled "Air Conditioner" filed on Feb. 16, 2022.
Australia Application No. 202210876 titled "Air Conditioner" filed on Feb. 16, 2022.
Australia Application No. 202210877 titled "Air Conditioner" filed on Feb. 16, 2022.
Australia Application No. 202210878 titled "Air Conditioner" filed on Feb. 16, 2022.
Australia Application No. 202210879 titled "Air Conditioner" filed on Feb. 16, 2022.
China Application No. 202230072949.8 titled "Rooftop heat exchanger" filed on Feb. 15, 2022.
China Application No. 202230072879.6 titled "Rooftop heat exchanger" filed on Feb. 15, 2022.
China Application No. 202230072942.6 titled "The cover of the heat exchanger" filed on Feb. 15, 2022.
China Application No. 202230073233.X titled "Rooftop heat exchanger" filed on Feb. 15, 2022.
China Application No. 202230073231 titled "Rooftop heat exchanger" filed on Feb. 15, 2022.
China Application No. 202230073218.5 titled "Rooftop heat exchanger" filed on Feb. 15, 2022.
China Application No. 202230073134.1 titled "Rooftop heat exchanger" filed on Feb. 15, 2022.
European Union Application No. 008654404-0001-0004 titled "Rooftop heat exchanger" filed on Aug. 16, 2021.
European Union Application No. 008654396-0001-0006 titled "Shape" filed on Aug. 16, 2021.
Office Action Issued in European Patent Application No. 19759430.2 mailed on Jan. 28, 2022.
Office Action Issued in German Application No. 102021208289 mailed on Feb. 8, 2022.
U.S. Appl. No. 29/826,755 titled "Housing" filed on Feb. 15, 2022.
U.S. Appl. No. 29/826,757 titled "Housing" filed on Feb. 15, 2022.
United Kingdom Application No. 6191825 titled "Ventilation and air conditioning equipment" filed on Feb. 15, 2022.
United Kingdom Application No. 6191826 titled "Ventilation and air conditioning equipment" filed on Feb. 15, 2022.
United Kingdom Application No. 6191827 titled "Ventilation and air conditioning equipment" filed on Feb. 15, 2022.
United Kingdom Application No. 6191828 titled "Ventilation and air conditioning equipment" filed on Feb. 15, 2022.
United Kingdom Application No. 6191837 titled "Ventilation and air conditioning equipment" filed on Feb. 15, 2022.
United Kingdom Application No. 6191838 titled "Ventilation and air conditioning equipment" filed on Feb. 15, 2022.
United Kingdom Application No. 6191839 titled "Ventilation and air conditioning equipment" filed on Feb. 15, 2022.
United Kingdom Application No. 6191840 titled "Ventilation and air conditioning equipment" filed on Feb. 15, 2022.
United Kingdom Application No. 6191841 titled "Ventilation and air conditioning equipment" filed on Feb. 15, 2022.
United Kingdom Application No. 6191842 titled "Ventilation and air conditioning equipment" filed on Feb. 15, 2022.
Design U.S. Appl. No. 29/645,887, filed Apr. 30, 2018 titled Mobile Air Conditioner.
Design U.S. Appl. No. 29/660,094, filed Aug. 17, 2018 titled Air Distribution Box.
U.S. Appl. No. 17/342,723, filed Jun. 9, 2021 titled Vehicle Air Conditioner.
Notice to Grant Issued in Chinese Application No. 202230073134.1 mailed on Apr. 12, 2022.
Office Action Issued in German Application No. 102021208289 mailed on Jun. 2, 2022.
Notification to Grant for Chinese Patent Application No. 202230073233.X mailed on Apr. 23, 2024.
Office Action issued in AU Application No. 2019291452 mailed on Apr. 26, 2024.
International Search Report and Written Opinion issued in PCT Application No. PCT/EP2024/051551 mailed on May 2, 2024.
Notification to Grant for Chinese Patent Application No. 202230073218.5 mailed on May 11, 2024.
Notification to Grant for Chinese Patent Application No. 201980040452.3 mailed on May 1, 2024.
Notice of Allowance issued in U.S. Appl. No. 29/826,755 mailed on Apr. 15, 2024.
Final Office Action issued in U.S. Appl. No. 17/252,506 mailed on May 15, 2024.
Office Action Issued in DE Application No. 102020206182.3 mailed on Dec. 7, 2023.
Office Action issued in CN Application No. 202230073233.X mailed on Dec. 7, 2023.
Office Action issued in CN Application No. 202230073218.5 mailed on Dec. 7, 2023.
Office Action issued in DE Application No. 102020206183.1 mailed on Dec. 7, 2023.
Installation Manual—Brisk II (B57915, B59516, B79516), High Performance (540315, 540316), Blizzard NXT (H540315, H540316), FreshJet (FJX3473, FJX3573), Available Online at:https://www.dometic.com/en-us/outdoor/rv-and-van/rv-air-conditioners, Published Oct. 31, 2023.
Non-Final Office Action issued in U.S. Appl. No. 29/915,796 mailed on Dec. 19, 2023.
Notice of Allowance issued in U.S. Appl. No. 29/915,798 mailed on Jan. 4, 2024.

(56) References Cited

OTHER PUBLICATIONS

AU Patent Application No. 2022317094 titled "Ventilation unit and recreational vehicle with a ventilation unit" filed on Jan. 23, 2024.
EP Patent Application No. 22734620.2 titled "Ventilation unit and recreational vehicle with a ventilation unit" filed on Feb. 6, 2024.
PCT Application No. PCT/EP2024/051551 titled "Ventilation unit and recreational vehicle with a ventilation unit" filed on Jan. 23, 2024.
U.S. Appl. No. 18/293,054 titled "Ventilation unit and recreational vehicle with a ventilation unit" filed on Jan. 29, 2024.
CN Patent Application No. 202280053379.5 titled "Ventilation unit and recreational vehicle with a ventilation unit" filed on Jan. 30, 2024.
Decision to Grant issued in EP Application No. 19759430.2 mailed on Mar. 14, 2024.
German Patent Application No. 112021000525.1 titled "Heating, Ventilation and Air Conditioning System with Illumination" filed on Sep. 12, 2022.
AU Patent Application No. 2021239071 titled "Heating, Ventilation and Air Conditioning System with Illumination" filed on Jul. 6, 2022.
Office Action issued in German Patent Application No. 112021000525.1 mailed on Oct. 25, 2023.
U.S. Appl. No. 29/915,796 titled "Housing Edge For Air Conditioning Apparatus" filed on Nov. 3, 2023.
U.S. Appl. No. 29/915,798 titled "Housing Portion For Air Conditioning Apparatus" filed on Nov. 3, 2023.
U.S. Appl. No. 29/915,799 titled "Housing For Air Conditioning Apparatus" filed on Nov. 3, 2023.
"Dometic FreshJet 3 Series 15K" Internet URL: https://www.dometic.com/en-us/outdoor/rv-and-van/rv-air-conditioners/dometic-freshjet-3-series-15k-263393, Year:2024.
"Dometic 9600028600 FreshJet 3 Series Standard Profile Mechanical Rooftop Air Conditioner, Cool Only—15,000 BTU, White", Internet URL: https://www.amazon.com/gp/aw/d/B0BGYXRMFM/?th=1, Year: 2024.
"RecPro RV Air Conditioner 13.5K Non-Ducted | Quiet AC | 110-120V | Cooling Only | Easy Install | All-in-One Unit | For Camper, Travel Trailer, Fifth Wheel, Food Trucks, Motor Home (White)", Internet URL: https://www.amazon.com/RecPro-Conditioner-110-120V-Non-Ducted-Installation/dp/B0B22WCYKR/?th=1, Year: 2024.
Restriction Requirement issued in U.S. Appl. No. 29/826,757 mailed on Jan. 19, 2024.
Notice to Grant Issued in Chinese Application No. 202230072942.6 mailed on Dec. 19, 2023.
Office Action issued in DE Application No. 102021208289.0 mailed on Dec. 22, 2023.
Intention to Grant issued in EP Application No. 19759430.2 mailed on Jan. 5, 2024.
Notice to Grant issued in CN Application No. 202230072879.6 mailed on Jan. 3, 2024.
Notice Allowance issued in Design U.S. Appl. No. 29/915,796 mailed on Jul. 15, 2024.
Notice Allowance issued in Design U.S. Appl. No. 29/915,798 mailed on Jul. 17, 2024.
Corrected Notice of Allowance issued in Design U.S. Appl. No. 29/915,796 mailed on Aug. 5, 2024.
Non-Final Office Action issued in Design U.S. Appl. No. 29/826,757 mailed on Aug. 20, 2024.
Non-Final Office Action issued in U.S. Appl. No. 17/998,616 mailed on Aug. 20, 2024.
Notice of Allowance issued in Design U.S. Appl. No. 29/826,755 mailed on Aug. 30, 2024.
Non-Final Office Action issued in U.S. Appl. No. 17/998,623 mailed on Sep. 10, 2024.
Corrected Notice of Allowance issued in Design U.S. Appl. No. 29/915,796 mailed on Sep. 19, 2024.
Corrected Notice of Allowance issued in Design U.S. Appl. No. 29/915,798 mailed on Sep. 26, 2024.
Corrected Notice of Allowance issued in Design U.S. Appl. No. 29/915,796 mailed on Oct. 23, 2024.
Decision to Grant Issued in DE Application No. 102023200650.2 mailed on Sep. 4, 2024.
Notice of Allowance issued in U.S. Appl. No. 17/252,506 mailed on Oct. 23, 2024.

\* cited by examiner

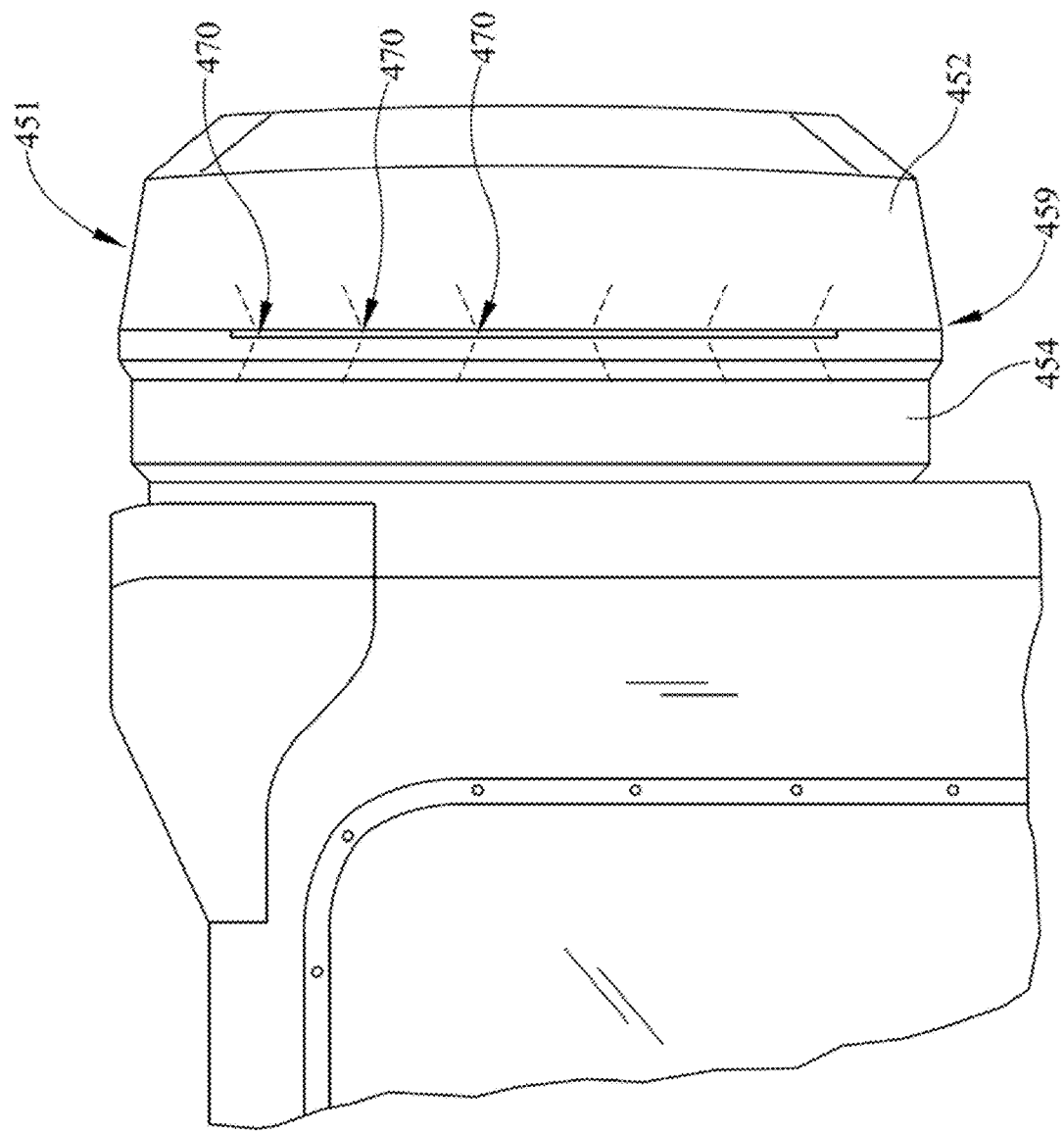

HEATING, VENTILATION AND AIR CONDITIONING SYSTEM WITH ILLUMINATION

CLAIM TO PRIORITY

This Non-Provisional patent application claims priority to and benefit of, under 35 U.S.C. § 119, U.S. Provisional Patent Application Ser. No. 62/992,595, filed Mar. 20, 2020. This Non-Provisional application is also a Continuation-In-Part application claiming priority to and benefit of, under 35 U.S.C. § 120, 371 National Stage patent application Ser. No. 17/252,506, filed Dec. 15, 2020, which claims priority to PCT Patent Application No. PCT/IB2019/055060, filed Jun. 17, 2019, which claims priority to and benefit of U.S. Provisional Patent Application Ser. No. 62/686,217 filed Jun. 18, 2018, all of which is incorporated by reference herein.

BACKGROUND

Field of the Invention

Present embodiments relate to heating, ventilation, and air conditioning ("HVAC") systems for recreational vehicles, marine vehicles and fixed structures utilizing same. More specifically, present embodiments relate to, without limitation, HVAC systems having illumination which emits from the housing of the HVAC mechanicals.

Description of the Related Art

HVAC systems are typically provided on motorized vehicles such as trucks, busses, motor homes, etc. and vessels such as boats, ships, etc. (hereinafter collectively referred to as "mobile units"). These devices may also be used on fixed structures as well. The HVAC devices provide conditioned air to the interior of the mobile or fixed structure to which the HVAC is mounted. During operation of the mobile unit the HVAC system is powered by the energy produced by the mobile unit's engine(s), a 12v DC source, or electricity provided for example at a camping site, often referred to as shore power.

When on camping trips, for example, there may be a desire to illuminate the area surrounding the recreational vehicle or alternatively a bus for example while stopped for rest. In part this may be for reasons of illuminating an area, or alternatively may be purely for aesthetics.

In many installations, the HVAC is one of, if not the, highest installed part of the vehicle, and would provide for a good location to provide a light source. Additionally, it would be desirable to provide a light of desired color or other functionality which is aesthetically pleasing.

The information included in this Background section of the specification, including any references cited herein and any description or discussion thereof, is included for technical reference purposes only and is not to be regarded subject matter by which the scope of the invention is to be bound.

SUMMARY

Present embodiments relate to a HVAC system which is used in both fixed and mobile structures, and which has a luminaire disposed in the HVAC to provide illumination therefrom. The luminaire may be a single continuously on light or it may be a flashing light with one or more patterns. The light may emit a single color or multiple colors. The light may also have a flashing sequence which corresponds to audio. The light may be wired to a switch and/or may be controlled by a smart device in wireless communication with the HVAC system.

According to some embodiments, a mobile air conditioner with illumination may comprise a housing formed by a base pan and an air shroud, a plurality of cooling mechanicals disposed in the housing, a pocket formed in an interior of the housing, a luminaire disposed in the pocket, and wherein light from the luminaire emanates from the pocket and is visible from an exterior of the housing.

According to some optional embodiments, the pocket may comprise a first pocket and a second pocket. The first pocket may be located along one side of the housing and the second pocket located along a second side. The first pocket may be located along a front side of the housing and the second pocket may be located along a rear side. The luminaire may be a first luminaire and a second luminaire. The luminaire may be a strip of light emitting diodes. The luminaire may have a first segment and a second segment. The mobile air conditioner may further comprise a connecting segment. The luminaire may be color adjustable. The housing may have a seam which extends between the base pan and the shroud. The light may emanate from the seam.

According to a further embodiment, a mobile air conditioner may comprise a housing having a plurality of air conditioner components disposed therein, a luminaire disposed within the housing and emanating outwardly from the housing, a pocket disposed within the housing wherein the luminaire is disposed, the luminaire providing a light stripe from the housing. The housing may have a seam defined between a base pan and an air shroud. The light stripe may be along the seam between the base pan and the air shroud. The luminaire may be color adjustable. The luminaire positioned in the pocket, and the light reflecting from a surface about the pocket and out through the seam.

All of the above outlined features are to be understood as exemplary only and many more features and objectives of a HVAC system with illumination may be gleaned from the disclosure herein. Therefore, no limiting interpretation of this summary is to be understood without further reading of the entire specification, claims and drawings, included herewith. Additional benefits and advantages of the present invention will become apparent to those skilled in the art to which it pertains upon a reading and understanding of the following detailed specification.

BRIEF DESCRIPTION OF THE DRAWINGS

In order that the embodiments may be better understood, embodiments of the HVAC system with illumination will now be described by way of examples. These embodiments are not to limit the scope of the claims as other embodiments of the HVAC system with illumination will become apparent to one having ordinary skill in the art upon reading the instant description. Non-limiting examples of the present embodiments are shown in figures wherein:

FIG. 13 is a side view of the HVAC system with illumination of FIG. 12.

DETAILED DESCRIPTION

Figure 1:
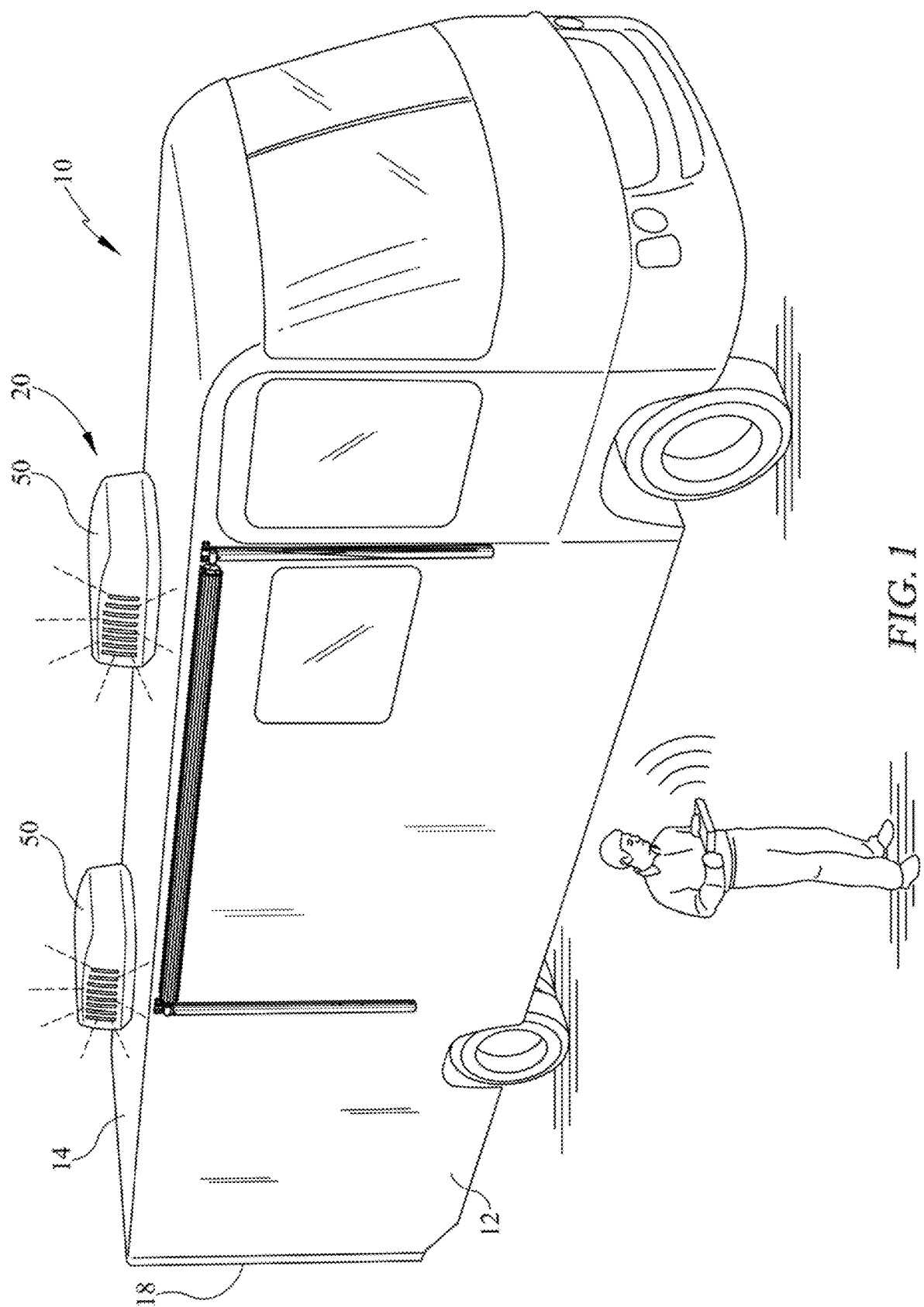
FIG. 1 is a perspective view of an illustrative, non-limiting recreational vehicle which may utilize a HVAC according to various embodiments.

It is to be understood that the HVAC system with illumination is not limited in its application to the details of construction and the arrangement of components set forth in the following description or illustrated in the drawings. The embodiments are capable of other variations and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings.

Referring now in detail to the drawings, wherein like numerals indicate like elements throughout several views, there are shown in FIGS. 1-13 various embodiments of a mobile air conditioner ("A/C") with illumination which may provide illumination from vent holes in the A/C housing. According to illustrative embodiments, an HVAC system is adapted for use on mobile or fixed structures. The term "mobile unit" as used herein includes vehicles having engines such as trucks, busses, motor homes, motorized or non-motorized recreational vehicles etc. and vessels having engines such as boats, ships, etc., but should also be understood to be inclusive of uses on fixed structures. The term "HVAC system" as used herein refers generally to an environmental-control unit for controlling an environment, which includes heating, cooling, ventilating, air handling, humidifying, dehumidifying, etc. in a controlled environmental space within the mobile unit. The controlled environmental space may include an operating portion, where an operator resides when the mobile unit is operational, and a sleeping portion where the operator rests when the mobile unit is not operational. The HVAC system is also suitable for use in a fixed structure, such as for non-limiting example, a small building.

Referring now to FIG. 1, a perspective view of a mobile unit, such as for non-limiting example a recreational vehicle 10 is depicted. As used herein, the term "recreational vehicle" (RV) refers to mobile homes, motor homes, travel trailers, fifth wheels, recreational vans and the like. A recreational vehicle may be one type of mobile unit. It should also be understood by one skilled in the art that the instant embodiment may be utilized with stationary structures having roof-mounted air conditioning units and air conditioning ducts extending through the ceiling area of the structure. Likewise, the embodiments of the instant disclosure are also suitable for use in various water crafts having exterior air conditioning units and duct work passing through cavities or spaces between the roof and ceiling. The depicted RV 10 includes a drive and transmission, not shown, as well as a sidewall 12 and a roof 14. Alternatively however, the RV may be in the form of a non-powered, pull-behind camper, non-mobile structures, and watercraft.

On the roof 14 of the RV 10, a portion of the air conditioning system 20 is depicted. An air conditioning unit 50 is positioned along the roof line in at least one position. According to the instant embodiment, two air conditioning units 50 are utilized in two separate locations to provide conditioned air to the interior of the RV 10. The interior may be a single zone or may be broken up into various zones.

An air conditioning system 20 includes an air conditioning unit 50 disposed on the roof 14 and may, or may not, include ducting below the roof 14 but above the ceiling below to provide conditioned air to the interior of the vehicle 10. In embodiments where ducting is not utilized, the system may also include an air distribution box (not shown) beneath the A/C unit 50 within the interior of the RV. The air conditioning unit 50 may be mounted in a variety of fashions, including but not limited to, fasteners passing through the roof 14, for example to or through structural members or through a template therein or combinations, for non-limiting example.

The air conditioning units 50 will be known to one skilled in the art and may include various models including, but not limited to, any of the Dometic Brisk, Brisk II, Penguin, Penguin II, or Blizzard NXT examples of air conditioning units, available from Dometic, Corporation having headquarters in Louisville, Ky. Further, while two air conditioning units 50 are shown, it is well within the scope of the present disclosure that a single air conditioning unit may be utilized or more than two units be utilized. Such number will be a design characteristic based on the load capability of the air conditioning unit and the volume of the vehicle 10 being cooled.

Also shown in the FIG. 1, is a person who may be using the illumination feature of the A/C units 50. The A/C units 50 desirably emit light of one or more colors from apertures in the units 50. The emission of lights may provide a desirable aesthetic appearance. The person is shown with a smart device, which may take various forms including but not limited to smart phone, smart pad, smart watch, mobile computer or other device capable of running an application (or "app") which may store control logic for operation of the A/C unit and/or lights.

Figure 2:
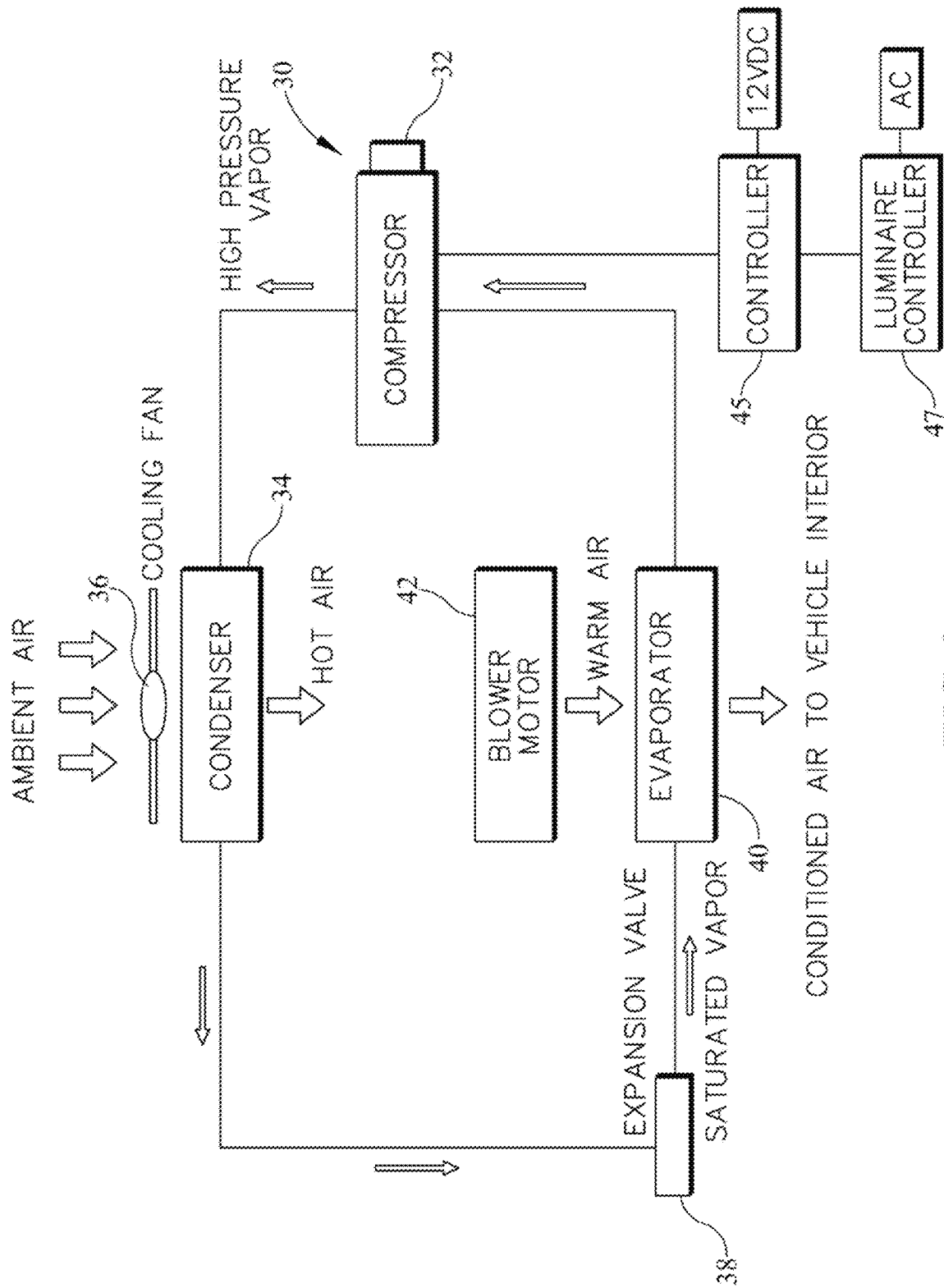
FIG. 2 is a schematic view of a number of components defining an HVAC.

Referring now to FIG. 2, a schematic view of HVAC components is depicted. Starting at the right hand side of the drawing, a compressor 30 is depicted. The compressor 30 may be connected to a motor 32 which drives the rotation or movement of the compressor 30 in order to compress a refrigerant. The compressor 30 may be a single speed, multi-speed, or variable speed compressor. The compressor 30 forces the compressed refrigerant upward along the schematic view toward a condenser 34. The condenser 34 may also comprise a cooling fan 36 which blows ambient air across a plurality of fins and/or coils which are in fluid communication with the refrigerant. The cooling fan 36 moves air across these fins and/or coils of the condenser 34 in order to reduce the temperature of the refrigerant which then moves to the left in the illustrative schematic view. The refrigerant continues toward an expansion valve 38 which reduces the pressure of the refrigerant and then further on to an evaporator 40. A fan 42 may also blow air from an interior of the RV or other enclosed volume across the fins and/or coils of the evaporator 40. At this time, the refrigerant is of a lower pressure and temperature such that the air blowing across it is cooled and returns into the enclosed space of the RV as a conditioned, cooled air which is comforting to the users and of decreased humidity.

After moving through the evaporator 40, the refrigerant returns to the compressor 30. At some position along the flow path of the refrigerant, a tank or other volume may provide a reservoir for the refrigerant, according to some embodiments. This option merely is illustrative and very general of the operation of an air conditioner which may be utilized in any of the embodiments described. Further, variations of the described components of the system may also be implemented and be within the scope of the instant embodiments.

Figure 3:
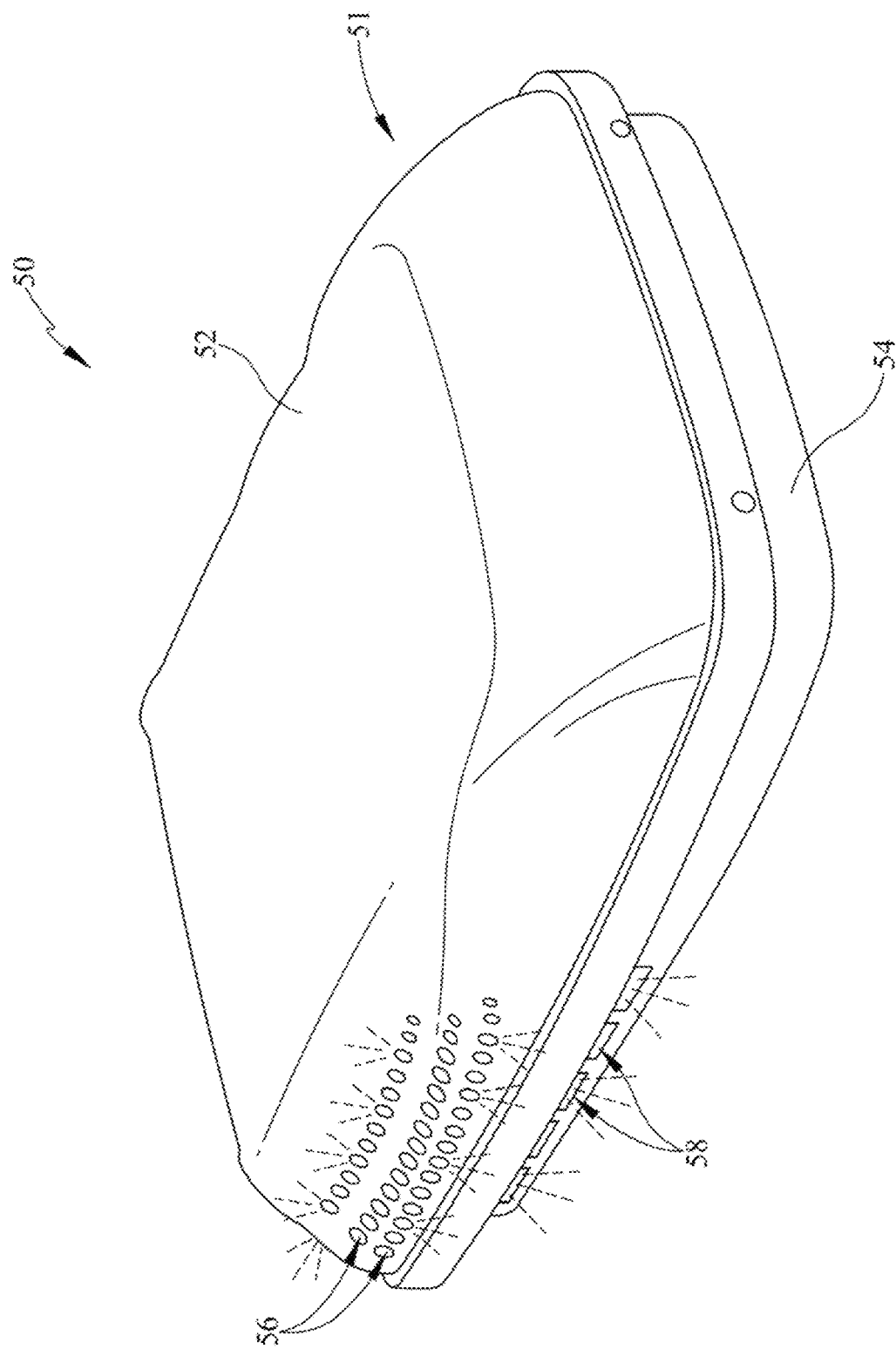
FIG. 3 is an exemplary perspective view of an illustrative HVAC with illumination.

Referring now to FIG. 3, a perspective view of an illustrative HVAC unit 50 with illumination is depicted. The depicted mobile air conditioner ("AC") 50 may be defined by an air shroud 52 and a base pan 54 that collectively form a housing 51. The air shroud 52 and the base pan 54 may be formed as a single part or may be formed as two parts which may be disconnected from one another. The removability of the air shroud 52 of the base pan 54 may allow for access of the interior of the air conditioner 50 wherein a plurality of mechanical components such as those described in FIG. 2 may be located. The mobile A/C unit 50 may also comprise a plurality of vent holes 56 in the air shroud 52 and/or vent holes 58 in the base pan 54. The vent holes 56, 58 may be utilized for air flow to or from the condenser 34 (FIG. 2) and also may allow illumination outwardly from inside the mobile A/C unit 50.

The mobile A/C unit 50 may be mounted on a roof top of a mobile structure such as an RV, truck, trailer, mobile home, or alternatively may be mounted on a fixed structure for use in cooling such. In some embodiments, the mobile A/C units may be mounted on other surfaces such as a front or rear surface of the mobile unit or RV, which may be a horizontal, vertical, or in between these surface orientations. Further, the mobile A/C unit 50 may be utilized with ducted or non-ducted cooling configurations within the mobile or fixed structure to which the mobile A/C unit 50 is connected.

Figure 4:
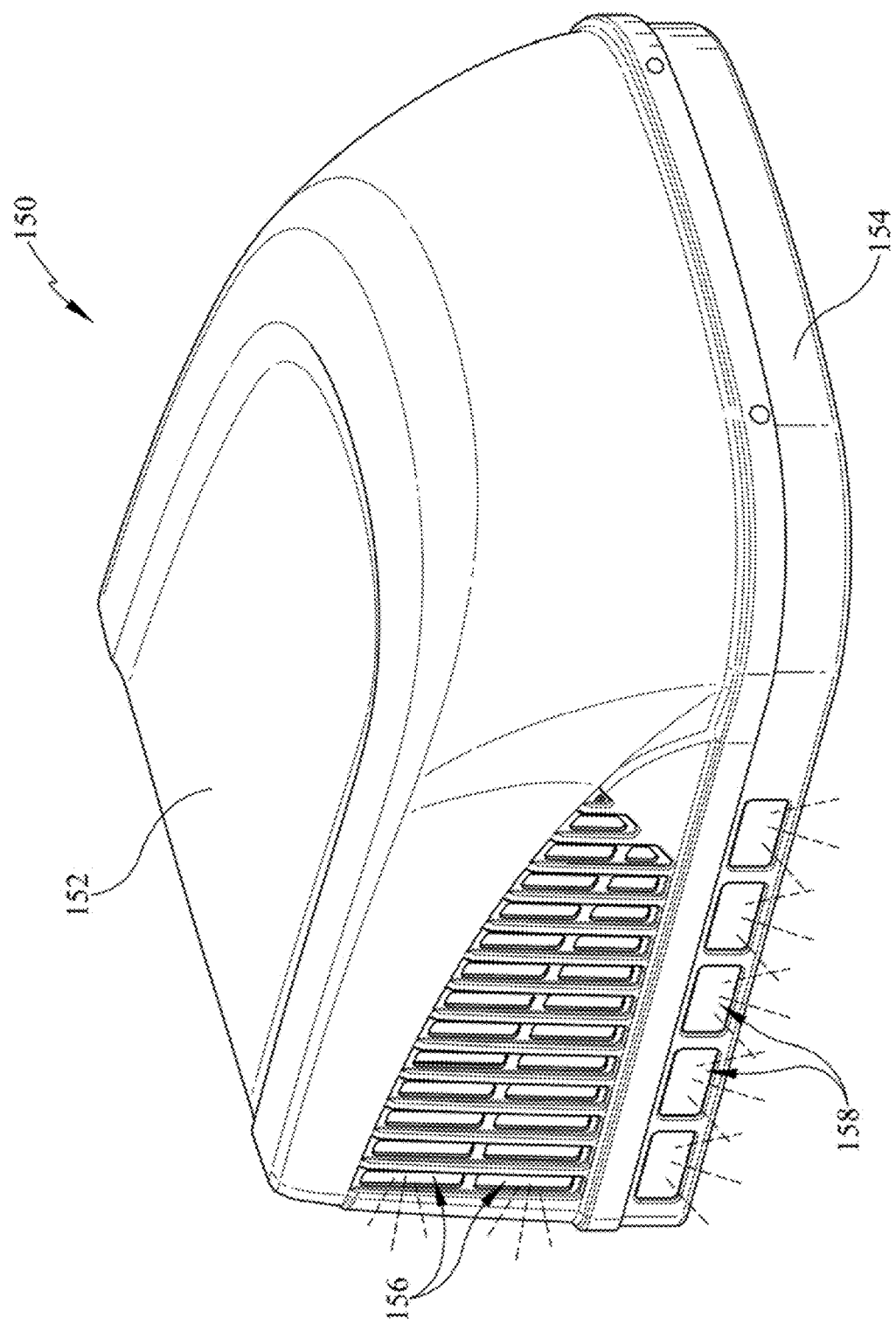
FIG. 4 is an exemplary perspective view of an alternate HVAC with illumination.

Referring now to FIG. 4, a perspective view of an alternative HVAC with illumination is depicted. The mobile A/C unit 150 is of a differing shape, primarily differing in that the embodiment of FIG. 3 was a low-profile design which has improved aerodynamic efficiencies. The embodiment of FIG. 4 may provide a larger system which provides similar characteristics in a larger size where aerodynamics may not be as important to an installer or user.

The mobile A/C unit 150 comprises an air shroud 152 and a base pan 154. The air shroud 152 and base pan 154 may be formed separately of two structures, however in some embodiments, may be formed as a single structure. The air shroud 152 may include a plurality of vent holes 156 and the base pan 154 may include a plurality of vent holes 158. As with the previous embodiment, the vent holes 156, 158 may be utilized to allow air flow to or from the condenser 34 (FIG. 2) and also illumination outwardly from inside the mobile A/C unit 150.

Figure 5:
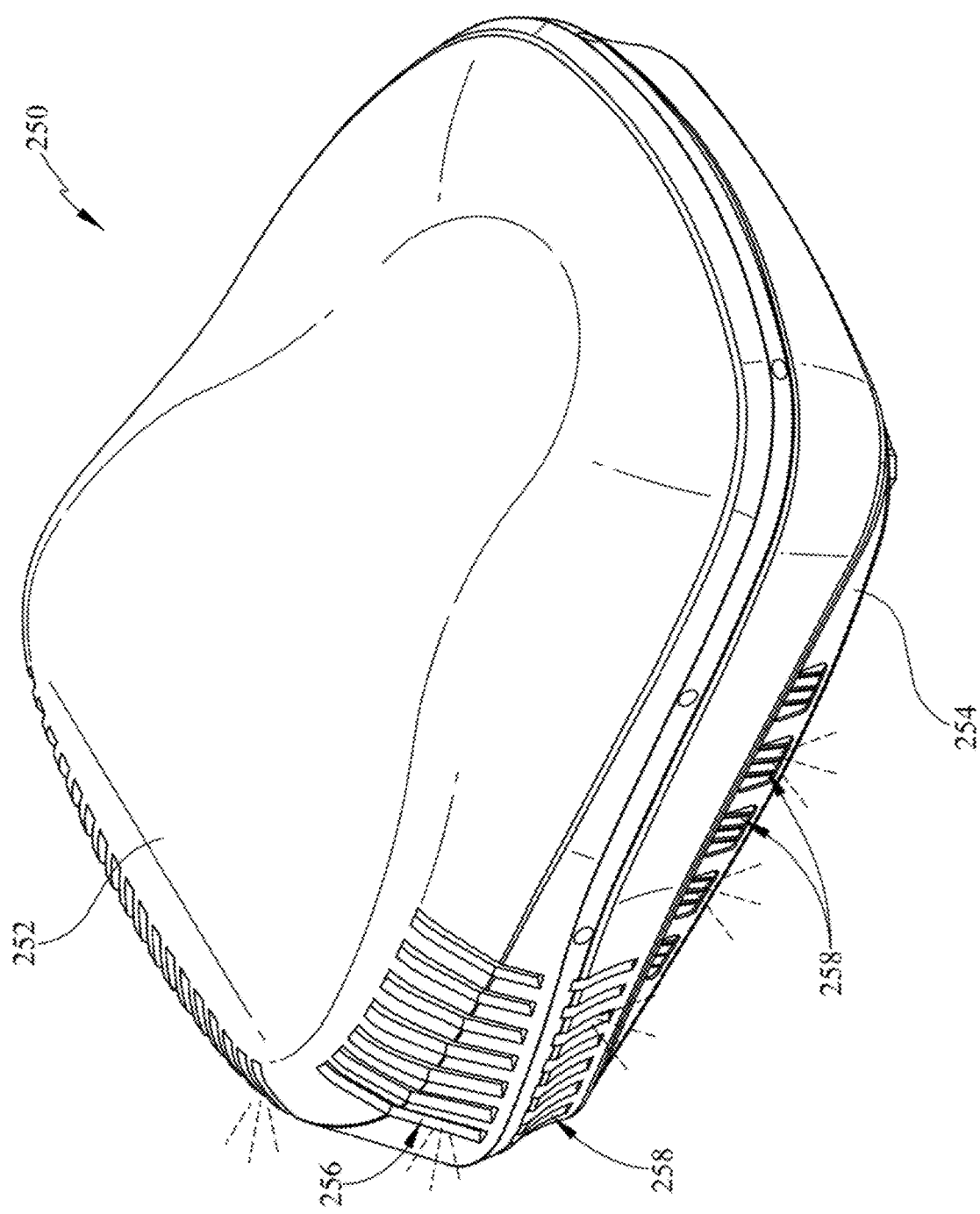
FIG. 5 is an exemplary perspective view of an alternative HVAC with illumination.

Referring now to FIG. 5, a further embodiment of a mobile A/C unit 250 is provided. The mobile A/C unit 250 provides still further that various shapes and designs may be utilized. The air shroud 252, again may provide a plurality of vent holes 256 while the base pan 254 may be provided with a plurality of vent holes 258. These vent holes 256, 258 may allow for air flow to or from the condenser 34 (FIG. 2) and also may allow for illumination to be emitted from the mobile A/C unit 250.

Figure 6:
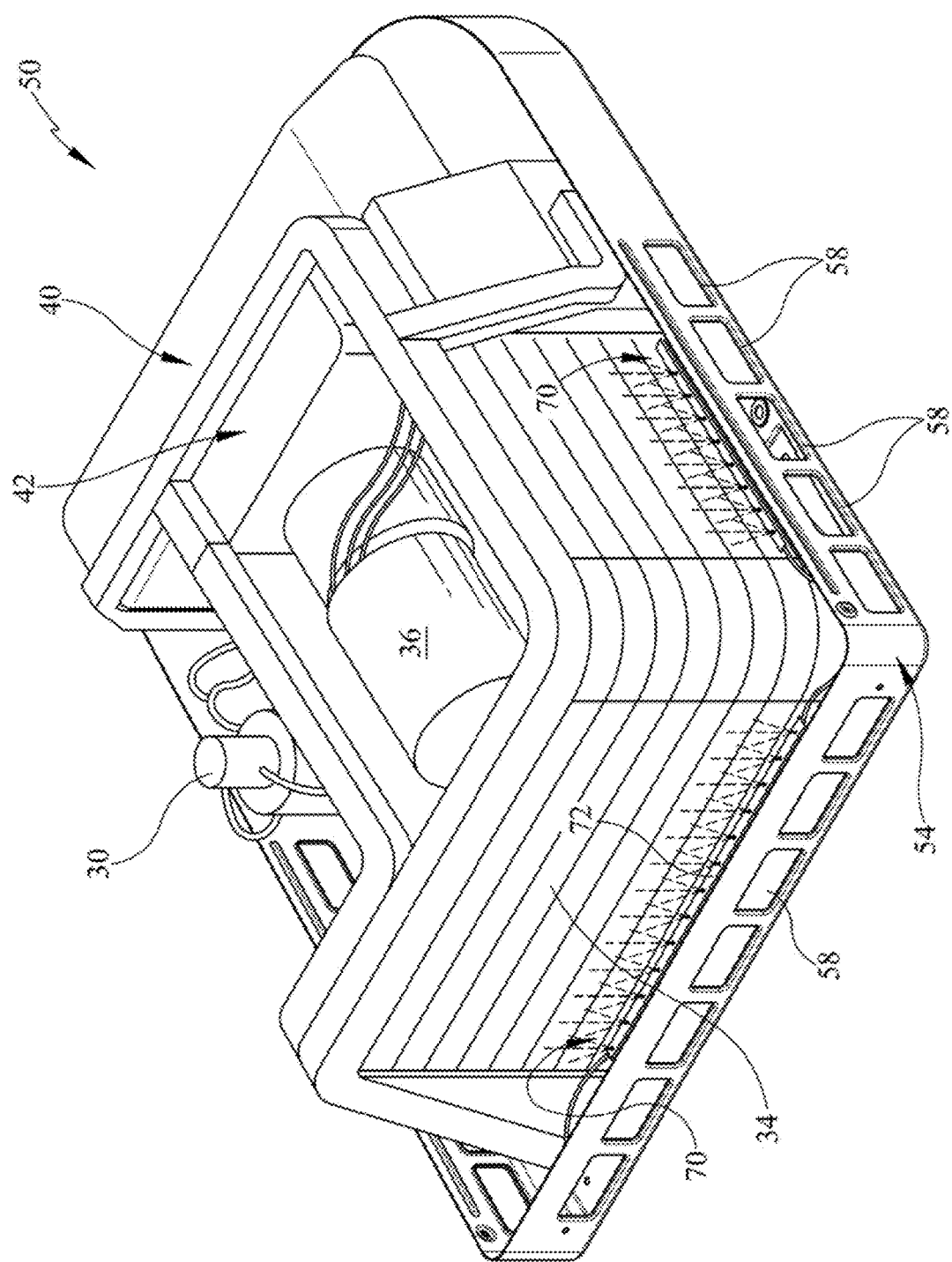
FIG. 6 is a perspective view of an HVAC of FIG. 3 with the air shroud removed to reveal the interior of the HVAC and the luminaires.

Referring now to FIG. 6, a perspective view of the illustrative A/C unit 50 with the air shroud 52 removed. The A/C unit 50 includes a base pan 54 having a plurality of vent holes 58, located around the lower perimeter thereof. The base pan vent holes 58 allow for air movement either toward and/or away from the condenser 34. As previously described, this air flow brings in ambient air and cools the compressed refrigerant passing through the condenser 34, as part of the cooling process. Also shown within the base pan 54 are the fan 42 and the evaporator 40, which are hidden by foam structures which reduce sound related noise and vibration associated with operation of those components. Additionally, the compressor 30 may be seen, including coils which extend toward the condenser 34 and from the evaporator 40 to the compressor 30. A fan housing for cooling fan 36 is also shown, wherein the fan 36 may pull air either into the system through the vent holes 58 or blow air from the system out across the condenser 34, through the vent holes 58.

Also shown in the embodiment is a luminaire 70 which may be embodied in some forms as at least one LED light strip 72. The LED light strip 72 may be located in various positions of the A/C unit 50, or any of the units described herein. In the exemplary embodiment, the luminaire 70 is defined by three LED light strips 72 which are positioned along the boundaries of the base pan 54. In the instant embodiment, the light strips 72 are located along the two lateral edges and the rear edge of the base pan 54, within the base pan 54 and adjacent to vent holes 58. The luminaries 70 emit light from the base pan 54 through the vent holes 58 due to their location. Further, the luminaires 70 may also reflect light from the fins and/or coils defining the condenser 34 so that a wall of soft light is defined which will also emit through the vent holes 58 of the base pan 54 and any holes in this area which are disposed on the air shroud 52 (FIG. 2). For example, in the instant embodiment, the air shroud 52 comprises vent holes 56 which would also emit light as the luminaires 70 would reflect from the condenser 34 through the vent holes 56.

The luminaires 70 may all be located in the same plane or may vary in different heights, relative to the base pan 54 depending from where vent holes 58 are located and/or vent holes 56 of the air shroud 52. Additionally, the instant embodiment depicts LED light strips 72 which are all horizontally positioned. However, other configurations are used, for example, where the light strips 72 are arranged in a vertical fashion.

The LED light strips 72 may be disposed in or on the base pan 54 in a variety of manners. Various structures or features may be utilized to affix the light strips 72 including, but not limited to, glue, cement, tape, fixatives, fasteners, or snap fit structures, all of which are non-limiting examples. It may be desirable to use a locking structure, such as a snap fit, according to some embodiments, since it would be highly undesirable for the light strips 72 to come loose during operation of the fan 42 or during movement of the mobile unit.

Figure 7:
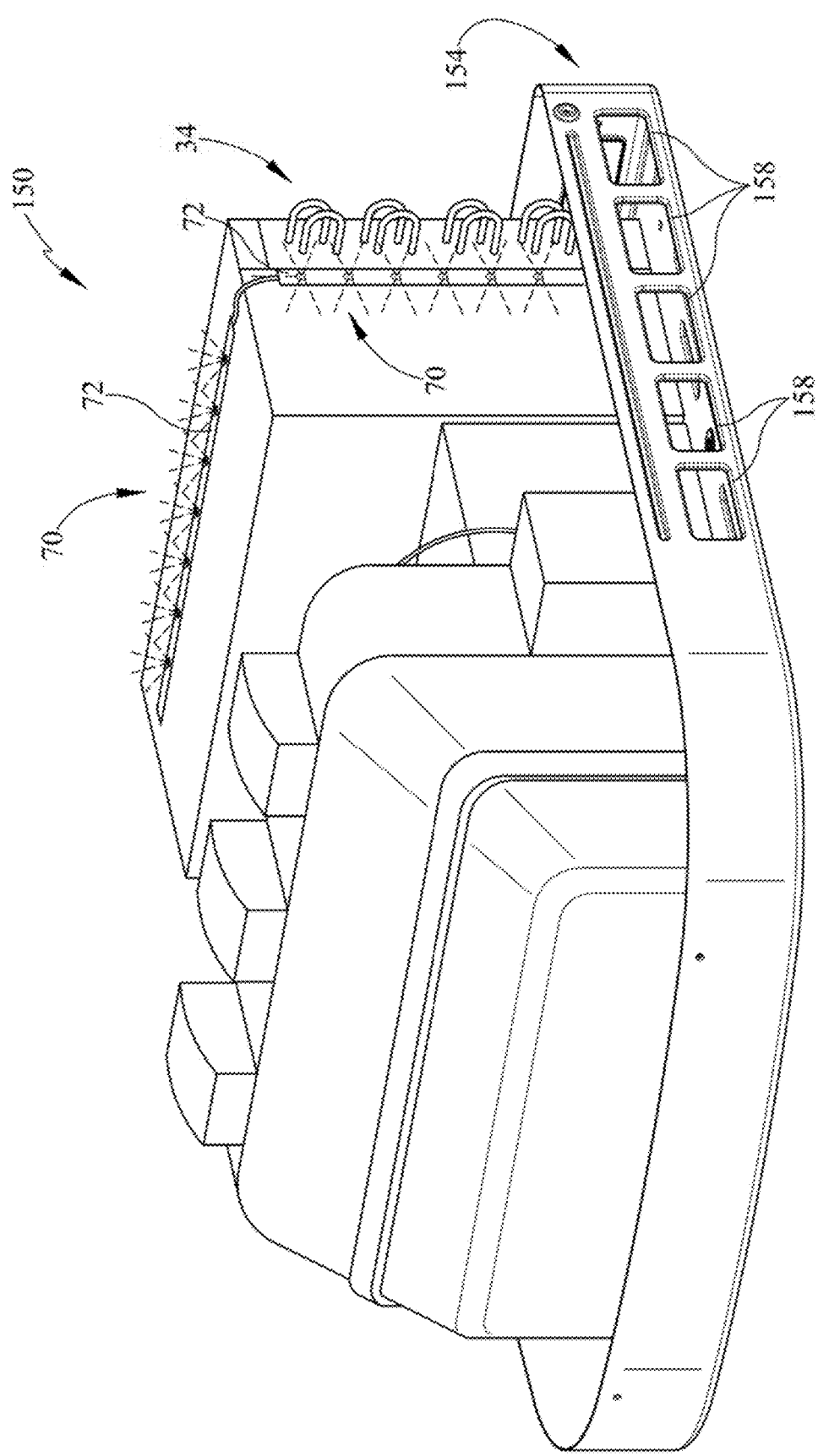
FIG. 7 is a perspective view of an alternate HVAC system.

Referring now to FIG. 7, an alternate embodiment is depicted which shows a base pan 154 of the mobile A/C unit 150. The air shroud is removed for viewing of the internal structures. In this view, a foam structure is disposed over the evaporator 40 and portion of the fan 42 associated therewith. Toward the rear of the mobile A/C unit 150, a plurality of coils are shown associated with the condenser 34. The base pan 154 also includes a plurality of vent holes 158 through which air may be pulled to either pass to the condenser 34 or exit from the condenser and out of the interior of the A/C unit 150.

Additionally, in this embodiment, a plurality of luminaires 70 are provided and again defined by LED light strips 72. At least one of the LED light strips 72 is oriented in a vertical fashion along the side of an internal component of the A/C unit 150. This may be desirable where an air shroud 152 (FIG. 4) is tall and light is desired along the height of the structure. Additionally, in this embodiment, the LED light strip 72 is also located along an upper edge of a component for shining through either apertures in the top surface of the air shroud or holes which may extend from side surfaces to an upper surface thereof. Thus, the LED light strips 72 should be understood as capable of being mounted in a variety of locations and in a variety of configurations within the A/C units.

According to some embodiments, the LEDs are powered by 12V which allows operation from the 12V RV system or alternatively may be operated by alternating current (AC) shore power which may be converted to DC. Likewise, generators or power inverters may be utilized to power the A/C unit 50, 150, 250 and thereby power the luminaires 70.

Still further, the controller associated with the LED lighting may be onboard a controller 45 for the AC mechanical components or may be within the mobile A/C unit 50 but in a separate housing therein (not shown). The luminaire controller 47 (FIG. 2) for the LED light strips 72 may be a Bluetooth controller or may be Wi-Fi connected, or have other wireless connection technology. The wireless communication will allow for the use of a remote control or smart device to control the lighting operation and desired effect, in addition to, or alternatively from, a wired light switch that may also be used. The luminaire controller 47 (FIG. 2) may control some number of LED strips 72.

Further according to some embodiments, it is possible that the luminaire controller may also be used to control other LEDs on the RV, such as for non-limiting example, LEDs on an awning assembly.

Various effects may be provided by the controller and controlled in the manners or by the devices described. In some embodiments, the luminaire 70 may be have any or all or combinations of the following functions. The luminaire 70 may be controlled in order to provide one or more colors. The luminaire 70 may also be a continuously on light or may be flashing in any of a plurality of sequences, with one color or multiple colors during the sequence. The sequences may be pre-programmed, may be random, or may be based upon other factors, for example an audio signal. For example, when music plays in the background, it may be desirable to use a microphone on the remote control or a smart device in order to capture an audio signal and provide light flashing in approximately synchronized manner to the music signal captured by the microphone. This may be done by "listening" for a specific frequency range, for example a lower, bassline frequency range, to which the flashing lights may be synchronized.

Further still, the luminaire controller may also have a motion sensor. In many jurisdictions, flashing lights on a vehicle may not be allowed, or may be limited in color, due the use of flashing lights of first responder vehicles. Thus flashing lights may only be used, in some embodiments, when the vehicle is not moving. Accordingly, a motion sensor may be provided, for non-limiting example, in the luminaire controller which inhibits use of the flashing lights when the vehicle is in motion. Alternatively, the remote or a smart device may be used to provide the motion sensing and in communication with the luminaire controller, may provide the motion sensing, then communicate to the luminaire controller. Accordingly, the usable colors may be limited if a flashing sequence is selected and/or if the vehicle is moving.

Figure 8:
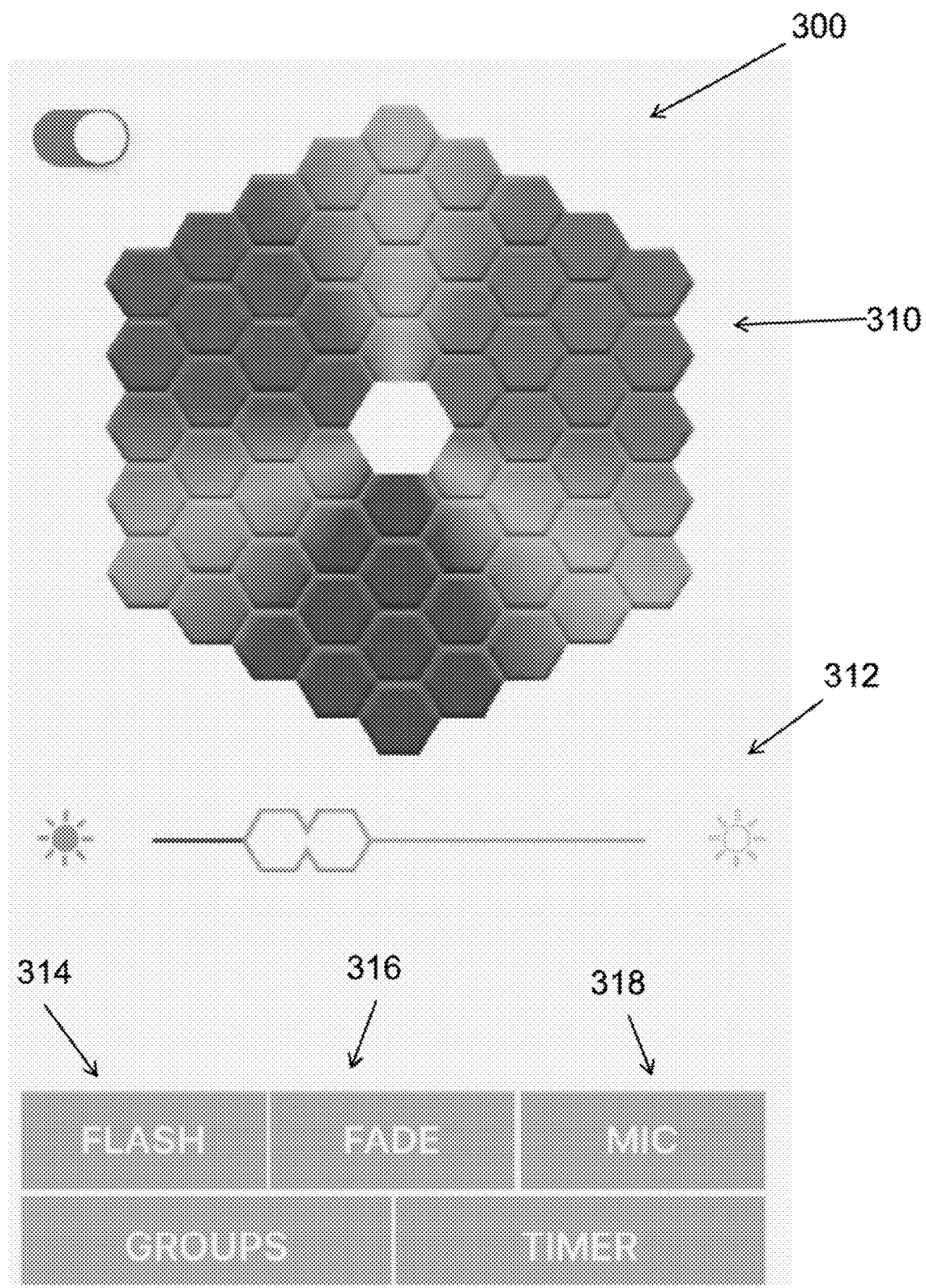
FIG. 8 is an illustrative selection screen from a remote or app of a smart device with various user selections for operation of the device.

In still further embodiments, the remote or smart device may provide an app wherein the color or colors may be selected by a user. The instant embodiments may provide that the app provides a color palette, for example on a touch screen. With reference to FIG. 8, a screenshot 300 is provided for a remote or smart device having an application ("app.") allowing the user to make selections for use of the illumination portion of the HVAC functionality. In the depicted figure, the smart device has a touchscreen with a color palette 310 so that various colors of a color spectrum including red, orange, yellow, green, blue, indigo and violet are provided, for example. Additionally, a slider or other control structure 312 for increasing or decreasing the brightness of the one or more luminaires 70. Other controls may be provided alternatively or additionally.

Still further at the lower portion of the screenshot 300 are additional controls for the luminaires 70. For example, one control button 314 provides for flashing lights. Another control button 316 may provide for effect like fade. Yet another control 318 may start the microphone function, as previously described to synchronize lighting to music which may be playing. Other functions may also be provided by the remote or app of the smart device in order to provide additional functionality such as a timer or in order to group specific lights together.

Still further, it may be desirable in some embodiments to provide illumination around an air distribution box (ADB) in the RV at the ceiling level. The base pan may have apertures that allow light to shine through the base pan and downward to provide interior illumination around the ADB. The luminaire may provide illumination about the interface of the ceiling and the ADB, or may provide light through a window provided in the ADB.

Figure 9:
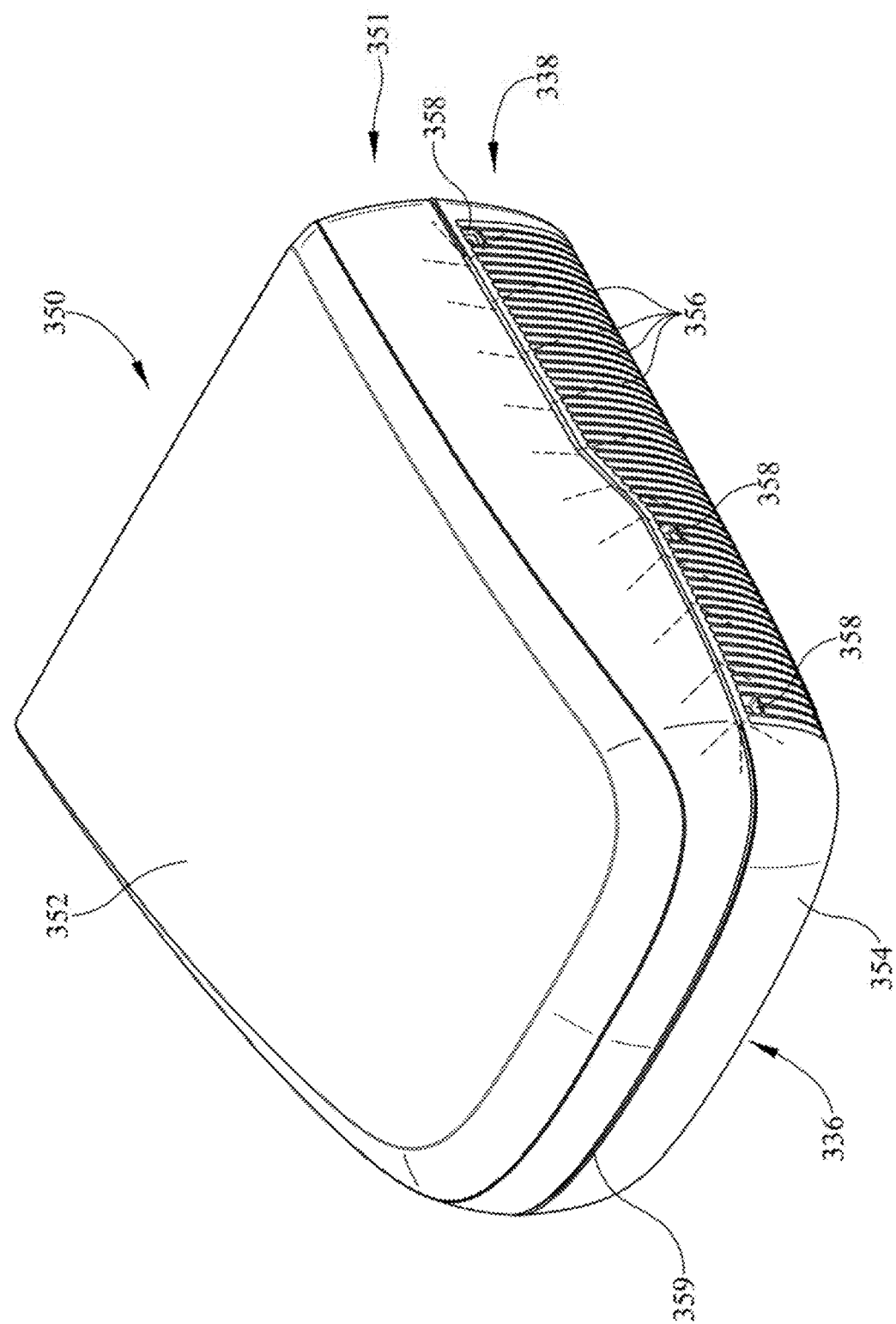
FIG. 9 is an exemplary perspective view of an alternate HVAC system with illumination.

Referring now to FIG. 9, a perspective view of a mobile air conditioning unit, or HVAC unit, is shown in perspective view and removed from a recreational vehicle (RV)10 (FIG. 1). The mobile AC or HVAC unit 350 comprises a housing 351 which may be mounted on the exterior of the RV 10. As with previous embodiments, the housing 351 may be located, for non-limiting example, on the roof 14 (FIG. 1) or a rear wall 18 of the RV 10 (FIG. 1). The housing 351 may comprise a forward end 336, toward the left side of the depicted figure, and a rearward end 338 toward the right side of the depicted figure, and sides extending between the forward and rearward ends. The forward and rear ends 336, 338 may be defined, for example, by the forward and rearward directions of the RV 10. The housing 351 may be formed of various shapes and in some embodiments, may have a curved or aerodynamic characteristics desirable to improve fuel mileage and approve aesthetic appearance. The housing 351 may be formed of a one-piece enclosure or may be formed of multiple structures to define the enclosure. For example, the present housing may be formed of a base pan 354 and an air shroud 352 positioned over the top of the base pan 354. The parts of the housing 351 may be entirely separable or may be hinged, for example in a clam shell-like arrangement. Each of the air shroud 352 and the base pan 354 may include sidewalls which meet to form a seam 359. The seam 359 may be a constant elevation about the periphery of the housing 351 or may vary in elevation with the changing shape of the housing 351.

Figure 10:
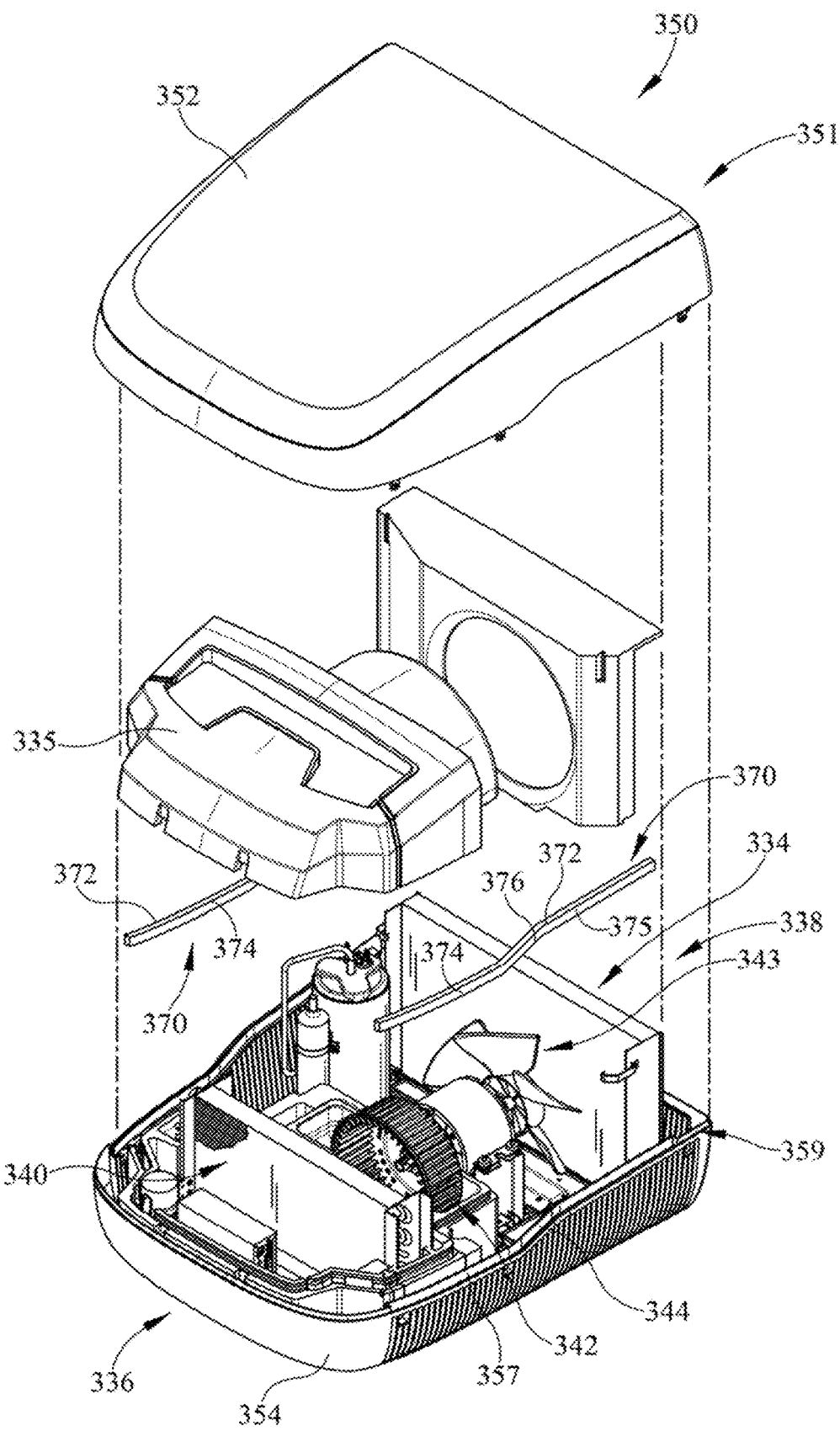
FIG. 10 is an exploded view of the HVAC system with illumination of FIG. 9.

Either or both of the base pan 354 and air shroud 352 may comprise a plurality of ventilation holes 356, 358 which allow for communication with ambient air within the housing 351 to exchange heat with the condenser 334 (FIG. 10). Additionally, the vent holes 356, 358 may allow illumination to emanate from the interior of the housing 351 to the exterior, if desirable as described in previous embodiments.

Also shown in this view, light is depicted emanating from the seam 359 along the sides of the housing. The seam 359 may be formed in a variety of manners to allow the light to pass through this area. When operating the light may appear, in some embodiments, as a light stripe such as a continuous stripe or beam of light, or in some embodiments may appear as one or more distinct lights, for example light dots.

Referring now to FIG. 10, the housing 351 is again shown wherein the air shroud 352 is exploded from the base pan 354. Within the base pan 354 are a plurality of cooling mechanicals, or cooling components, which may also include one or more heating structures, for example a heating element. Still further, other heating components may be located within the housing 351 for example a furnace arrangement may be utilized to provide heat throughout the RV 10 (FIG. 1). The depicted base pan 354 shows a condenser 334 at the rear end 338 of the base pan 354 and a foam insulation 335 at the forward end 336 of the base pan 354. Beneath the foam insulation 335 at the forward end 336 of the base pan 354 may be an evaporator 340 and fan 342 to push air from the interior space of the RV 10 through the evaporator 340 for heat exchange and force the air back into the RV 10. As one skilled in the art will understand, the condenser 334 also functions as a heat exchanger pulling air across a plurality of coils to exchange heat with the ambient air pulled into and blown out of the housing 351. The fan 342 for the cooling mechanicals may comprise one or more fans which are utilized with the evaporator 340 and the condenser 334 for the heat exchange described. In the instant embodiment for example, there may be two fans 342, 343, one for the evaporator 340 and one for the condenser.

Also shown exploded from the housing 351 is at least one luminaire 370. The luminaire 370 may be embodied by various types of lights including but not limited to an LED light strip 372 which may be located in various positions of the HVAC unit 350. For example, the instant example may provide one luminaire 370 along each side of the housing 351. The luminaire 370, in this embodiment or any of the embodiments may be formed by a single strip or multiple strips with light emitting diodes (LEDs). The LEDs may be continuous within the strip or may be in groups of one or more LEDs that are spaced apart within the single strip. Also, portions of the strip not containing LEDs may also be painted or colored in a dark opaque color to separate the group of lights and present separated illuminated segments with a single strip, for example. The light strips 372 in this embodiment or any of the embodiments may also be flexible to provide the bends or segments shown, and described further herein.

The base pan 354 or the air shroud 352, or both, may include at least one pocket 357 wherein the luminaire 370 is located. According to some embodiments, the pocket 357 may be formed along an interior edge of the base pan 354 and located near a seam 359 defined between the base pan 354 and the shroud 352. The pocket 357 may be formed by a structure that is connected to the interior of either the base pan 354 or the shroud 352 or may be integrally molded therein. For example, a wall 344 (see also FIG. 10A) may extend about one of the base pan 354 or the air shroud 352 toward the other of the base pan 354 or the air shroud 352 and inhibit contaminants from entering the housing 351. The wall 344 may extend near edges of the housing 351 but may deviate away from the periphery in order to create a space defining the pocket 357. Thus, the pocket 357, in some non-limiting embodiments, may be formed between the outer surface of the housing 351 and the wall 344. The pocket 357 may be located in an area where the wall 344 moves away from the outer surface of the housing 351. When viewed from above for example, the wall 344 may be U-shaped generally. The pocket 357 may be formed of a size corresponding to the size of the luminaire 370. The pocket 357 may be a single pocket or may be segmented into multiple smaller pockets. The luminaire 370 may be weather-resistant to inhibit damage from rain, snow, dirt, and the like along the opening of the pocket 357. The opening formed by the seam 359 may therefore allow light to emanate from the housing 351. In other embodiments, the housing 351 may not have an opening along the seam, but instead may include a transparent, translucent, or semi-translucent portion to allow light to emanate from the pocket 357. In still further embodiments, the transparent, translucent, or semi-translucent portion may be disposed over the seam 359 to protect the luminaire 370 but allow light to emanate.

In the instant embodiment, the luminaire 370 may be, for example, a light strip 372 having a plurality of LEDs positioned there along and one or more lenses about the LEDs. The luminaire 370 may be one light strip 372 or a plurality. The one or more light strips 372 may be formed of one or more segments 374, 375, 376 and may correspond to any of the edges of the housing 351. For example, in some embodiments, the seam 359 defined between the air shroud 352 and the base pan 354 may be illuminated. In the instant embodiments for example, the side seams where the luminaire 370 is located may be defined by first and second segments and a third connecting segment extending therebetween, corresponding in size and shape to the light strip 372. Accordingly, the luminaire 370 may have first and second segments 374, 375 and a third connecting segment 376 extending therebetween so that the profile or edge shape of the seam 359 is illuminated. When illuminated, the light may have the appearance of a continuous light in the area of the light strips 372.

Figure 10A:
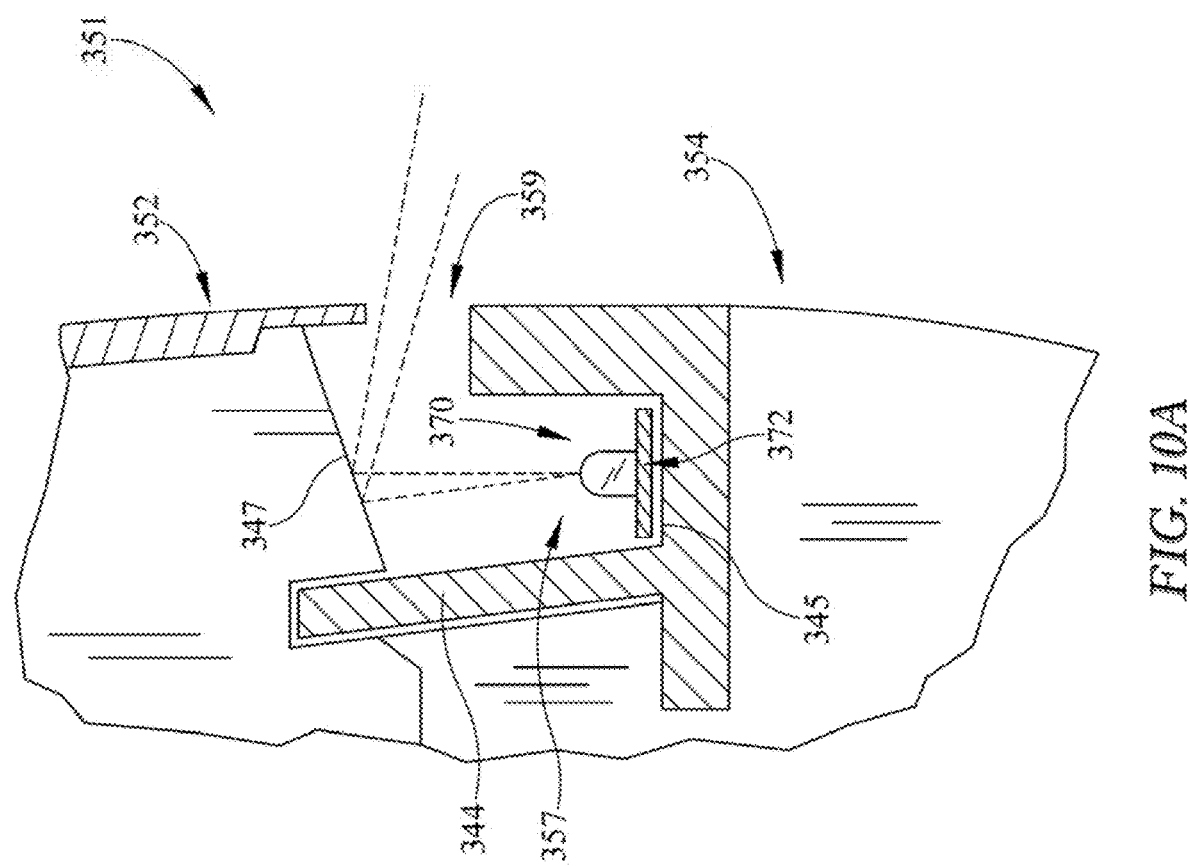
FIG. 10A is a side section view of an example of an arrangement for illumination.

Referring still to FIG. 10A, a section detail view of the example housing 351 is shown. The view provides one example arrangement of the pocket 357 within the base pan 354, the air shroud 352, and the luminaire 370 therein. While the housing 351 is described, any of a plurality of housings may be formed in this manner in order to allow the illumination and the pocket arrangement may be utilized in a variety of locations of any housing in order to provide desired illumination, thus this example should not be considered limiting.

The housing 351 is shown defined by the air shroud 352 and the base pan 354. Between the air shroud 352 and the base pan 354 is the seam 359 from where light emanates. The pocket 357 is shown in the base pan 354 along an edge of the base pan 354 where the base pan 354 and air shroud 352 form a gap therebetween, and where light may be emitted. The pocket however may also be located in the air shroud for example, or at other locations were lighting is desired. The pocket 357 is shown formed by structural members, such as wall 344 and a floor 345 between the wall 344 and outer edge of the base pan 354. The pocket 357 may extend in any area where a luminaire may be located for light, for example along the periphery of the base pan 354.

Within the pocket 357, the luminaire 370 is shown. In some embodiments, the luminaires 370 are disposed in the pocket 357 and emit light in an upward direction. The air shroud 352 may have a flange or surface that extends over the pocket 357 and reflects light outward through the seam 359 between the air shroud 352 and the base pan 354.

Specifically the luminaire 370, may be an LED light strip 372 which may be sealed, in some embodiments for protection from weather and other contaminants. According to some embodiments, the luminaire 370 is located within the pocket 357 and directs light upwardly. The light may reflect from a surface 347 above the pocket 357 to turn and emanate through the seam 359 between the base pan 354 and the air shroud 352. Alternatively, the luminaire 370 and pocket may be located in the shroud 352 and directly light downward and from the seam 359.

Figure 11:
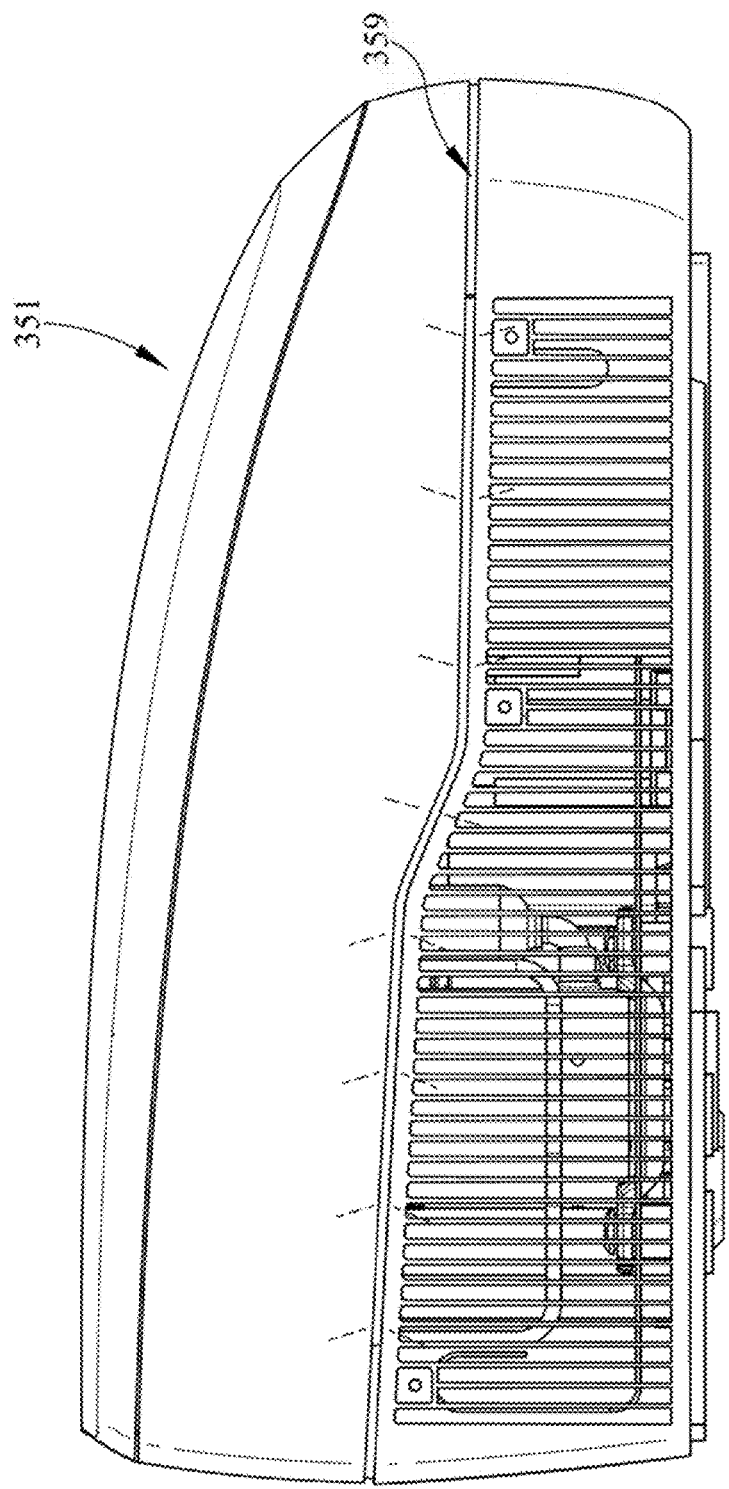
FIG. 11 is a side view of the HVAC system with illumination of FIG. 9.

Referring now to FIG. 11, a side view of the HVAC housing 351 is shown. The luminaire 370 is shown illuminating light from the housing 351 at a location between the base pan 354 and the air shroud 352. Accordingly, the appearance is that of a light stripe which is shown along the edge line of the housing and emanating from the seam 359.

The side view depicts that the light emanates from at least one side of the HVAC housing 351. In the instant embodiment, as indicated by the position of the luminaires 370 in FIG. 10, includes light stripes on two sides of the housing 351. However, the luminaires 370 may also be positioned additionally or alternatively along the front and rear ends 336, 338 (FIG. 10) of the housing 351. Still further, the luminaires 370 may be positioned at other locations such as along contour edges of any surface or entirely around the periphery of the HVAC housing 351 or at a specific feature of the housing 351. This may be dependent upon the position of the HVAC unit 350 relative to the RV 10.

Figure 12:
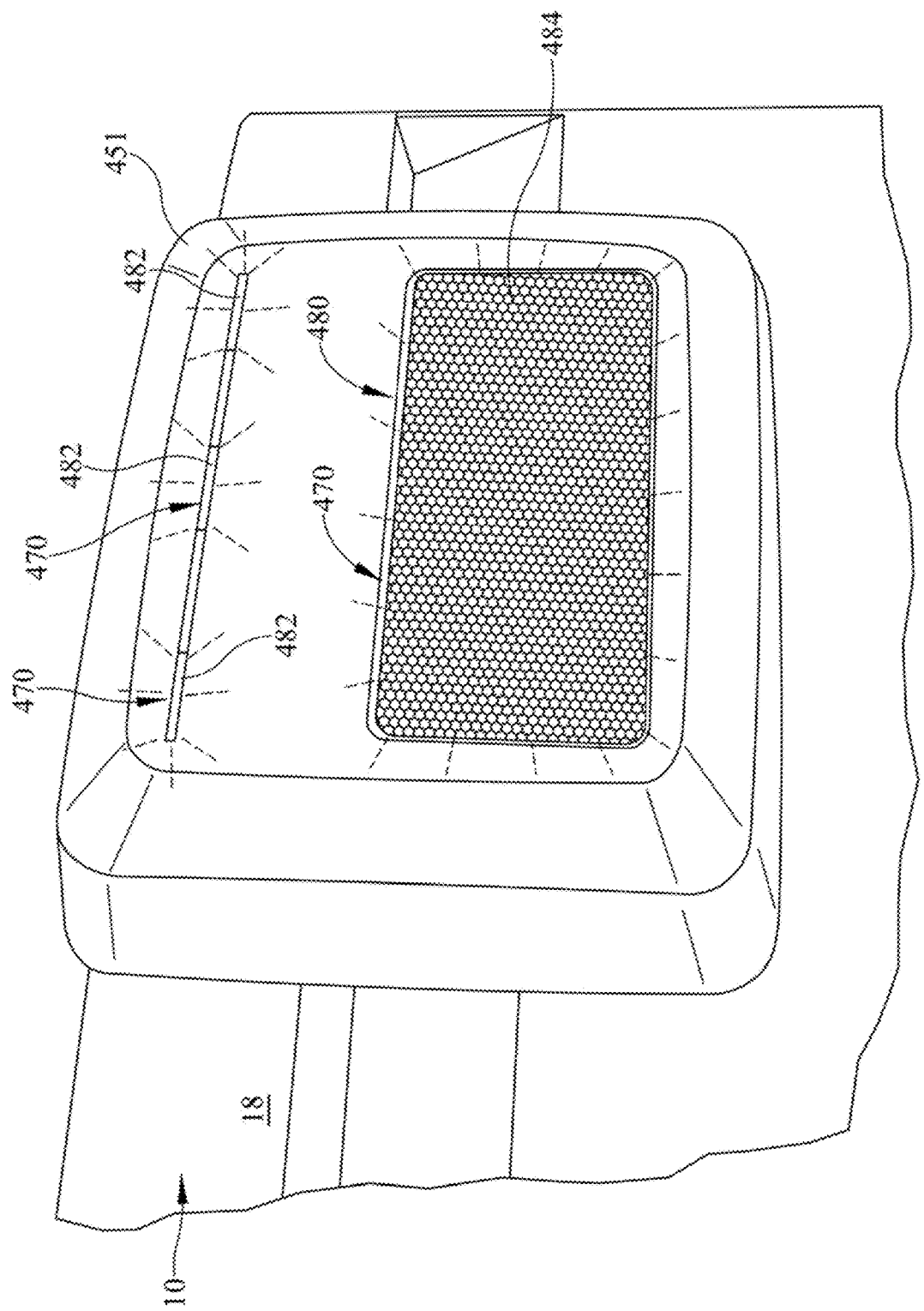
FIG. 12 is an exemplary perspective view of an alternate HVAC system with illumination.

For example, and with reference to FIG. 12, an HVAC housing 451 is shown on a rear surface 18 of an RV 10. In this embodiment the housing 451 has a top, bottom, and sides. The instant embodiment provides that light may emanate at locations other than seams 359. The housing 451 is shown having a depression 480 formed in a rear surface of the HVAC housing 451. The depression 480 may be a surface feature or may be functional, for example having a grill 484, as shown for air flow. The luminaire 470 may be placed along a surface or an edge of the depression 480 to highlight the surface change or contour. As a further example, and with brief reference to FIG. 4, a depression is shown in the upper surface of the air shroud 152, wherein a luminaire could be positioned. Referring back to FIG. 12, openings may be formed along an edge of the depression 480 to allow light to exit, for example, be along an edge of the depression 480 or within the depression. Alternatively, transparent, semi-transparent or translucent areas may be provided in the housing 451. In other embodiments, the luminaire 470 may be disposed within the surface forming the depression, rather than along an edge.

Additionally, an opening 482 may also be formed in the rear surface for position or parking light lighting, or may alternatively be utilized for brake lights when the RV 10 is in motion. The opening 482 may be a single opening or a plurality of openings. The luminaire(s) 470 may be located in this opening 482 as well. The light emitted may also be utilized to meet requirements for what are sometimes referred to as clearance lights as well.

Still further, for example, a logo may be desirable in some embodiments and such logo may also be illuminated as shown, for example, in the space between the grill 484 and the light opening 482 or other location according to any embodiment. The logo may be formed of a diffusive material and may be located in the position shown or in other positions depending on the shape and location of the housing.

Still further, and with reference to FIG. 13, a side view of the HVAC housing 451 is shown in which the housing 451 of FIG. 4 is formed of a base pan 454 and air shroud 452. A seam 459 is formed between the base pan 454 and air shroud 452 and a luminaire 470 is positioned within a pocket (not shown) of one of the two structures and adjacent to the seam 459 so that light emanates from the seam 459 and defines a light stripe therebetween.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the invent of embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teaching(s) is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms. The indefinite articles "a" and "an," as used herein in the specification and in the claims, unless clearly indicated to the contrary, should be understood to mean "at least one." The phrase "and/or," as used herein in the specification and in the claims, should be understood to mean "either or both" of the elements so conjoined, i.e., elements that are conjunctively present in some cases and disjunctively present in other cases.

Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The foregoing description of several methods and an embodiment of the invention has been presented for purposes of illustration. It is not intended to be exhaustive or to limit the invention to the precise steps and/or forms disclosed, and obviously many modifications and variations are possible in light of the above teaching. It is intended that the scope of the invention and all equivalents be defined by the claims appended hereto.

What is claimed is:

1. A mobile air conditioner with illumination, comprising:
    a housing formed by a base pan and an air shroud, configured to be positioned on an exterior of a recreational vehicle;
    a compressor, evaporator, and condenser disposed in said housing;
    a pocket formed in an interior of said housing, adjacent a seam between said base pan and said air shroud;
    a luminaire disposed in said pocket;
    light from said luminaire emanating from said pocket and said seam and being visible from an exterior of said housing at an exterior of said recreational vehicle.

2. The mobile air conditioner of claim 1, said pocket comprising a first pocket and a second pocket.

3. The mobile air conditioner of claim 2, said first pocket located along one side of said housing and said second pocket located along a second side.

4. The mobile air conditioner of claim 2, said first pocket located along a front side of said housing and said second pocket located along a rear side.

5. The mobile air conditioner of claim 1, said luminaire of being a first luminaire and a second luminaire.

6. The mobile air conditioner of claim 1, said luminaire being a strip of light emitting diodes.

7. The mobile air conditioner of claim 6, said luminaire having a first segment and a second segment.

8. The mobile air conditioner of claim 7, further comprising a connecting segment.

9. The mobile air conditioner of claim 6, said luminaire being color adjustable.

10. The mobile air conditioner of claim 1, said housing having said seam which extends between said base pan and said air shroud and varies in elevation about said housing.

11. The mobile air conditioner of claim 10, said light emanating from said seam.

12. A mobile air conditioner, comprising:
    a housing having a plurality of air conditioner components disposed therein, said housing comprising a base pan and an air shroud;
    a seam defined between said base pan and said air shroud;
    a luminaire disposed within said housing and emanating light outwardly from said housing to an exterior of a recreational vehicle upon which said housing is capable of being mounted;
    a pocket disposed within said housing wherein said luminaire is disposed, said light emanating from one or both of said seam of said housing or a vent hole;
    said light comprising a light stripe emanating from said seam.

13. The mobile air conditioner of claim 12, said luminaire being color adjustable.

14. The mobile air conditioner of claim 12, said luminaire positioned in said pocket.

15. The mobile air conditioner of claim 12, said light stripe reflecting from a surface about said pocket and out through said seam.

* * * * *